United States Patent [19]
Nakamichi

[11] Patent Number: 5,594,710
[45] Date of Patent: Jan. 14, 1997

[54] DISC PLAYER WITH A DISC-SECURING MECHANISM

[75] Inventor: Niro Nakamichi, Rancho Palos Verdes, Calif.

[73] Assignee: Nakamichi Corporation, Tokyo, Japan

[21] Appl. No.: 317,294

[22] Filed: Oct. 3, 1994

[30] Foreign Application Priority Data

Oct. 5, 1993 [JP] Japan ................................ 5-273102

[51] Int. Cl.$^6$ ................................................ G11B 17/26
[52] U.S. Cl. ............................ 369/36; 369/178; 369/191
[58] Field of Search ............................... 369/36, 38, 178, 369/191, 192

[56] References Cited

U.S. PATENT DOCUMENTS

| 2,297,014 | 9/1942 | Offen | 369/192 |
| 5,177,722 | 1/1993 | Nakamichi et al. | 369/36 |
| 5,210,728 | 5/1993 | Noguchi et al. | 369/36 |

FOREIGN PATENT DOCUMENTS

| 0632443 | 1/1995 | European Pat. Off. | |
| 0687112 | 2/1953 | United Kingdom | 369/191 |
| 2241104 | 8/1991 | United Kingdom | |

Primary Examiner—Robert S. Tupper
Assistant Examiner—David D. Davis
Attorney, Agent, or Firm—Morrison Law Firm

[57] ABSTRACT

A disc player has a magazine for storing discs and a disc transport mechanism transporting a selected disc between a playback position outside the magazine and a store position located within the magazine. The carriages are stacked upon each other and pivotally supported within the magazine. The carriages are extracted from the stack by lifting a front end of a carriage above a selected carriage. Subsequent to the lifting of the carriage, the selected carriage is withdrawn from the magazine to the playback position. When a selected carriage is moved to the playback position, the discs on carriages above and below the selected carriage are prevented from shifting with the removal of the selected carriage by coaxial opposing shafts which extend through spindle holes in the discs on the carriages above and below the selected disc. A closeable gap between the two shafts permits the selected disc to be shifted. The gap is closed, except when a carriage is being shifted into or out of the magazine, thereby preventing discs and their carriages from shifting due to vibration or tilting of the cabinet. When the device is in a stop mode, the magazine shifts to pierce any carriages capable of holding discs of different sizes, thereby preventing smaller disc from moving into recesses for larger discs.

11 Claims, 28 Drawing Sheets

DISC PLAYER WITH A DISC-SECURING MECHANISM

BACKGROUND OF THE INVENTION

The present invention relates to a disc player having a magazine for holding a plurality of discs, and which is capable of continuous playback of discs from the magazine. In particular, the disc player of the present invention has a magazine with a securing mechanism for preventing displacement of discs within the magazine due to vibration or inclination of the disc player.

The present application is a continuation-in-part of prior filed U.S. patent application Ser. No. 08/253,887, filed Jun. 3, 1994.

The preferred embodiment of the device disclosed in the parent application, copending herewith, includes a disc player in which a security device prevents vibrations from moving discs within a magazine. In that device, upper and lower disc-lock shafts engage disc spindle holes and the carriages which support each disc. A closable gap between the upper and lower disc-lock shafts is used, when opened, to pass a single disc from the magazine into playback and eject positions.

A drawback of the above is that the mechanism which closes the gap between the upper and lower disc-lock shafts only does so during the eject mode of operation. This created a difficulty in that the security mechanism ineffective during playback and stop modes.

A further drawback of the above is that the first carriage, located at the lower end of the magazine, has a first 12 cm diameter cavity and a second 8 cm cavity for mounting large and small discs, respectively. When the first carriage is disposed in the gap between the upper and lower disc-lock shafts, the shafts do not pierce effectively the spindle hole in the disc. This is not a problem with a 12 cm in the carriage, since the depression in the carriage, together with the underside of the next-higher carriage, prevents unwanted motion of the 12 cm disc. With an 8 cm disc in the second 8 cm cavity in the carriage, vibration or incline of the device could dislodge the disc from the 8 cm cavity into the 12 cm cavity. In some cases this can jam the disc player components and damage the disc.

OBJECTS AND SUMMARY OF THE INVENTION

It is accordingly an object of the present invention to provide a changer-type disc playback device which overcomes the drawbacks of the prior art.

It is a further object of the present invention to provide a security mechanism to prevent discs stored within a magazine from unwanted motion due to the effects of vibrations or inclines during all modes of operation of the disc player.

It is still a further object of the present invention to provide a disc playback device which returns its magazine to a position of rest, engaging the security mechanism, during its stop mode to ensure that 8 cm discs are properly secured within the security mechanism.

Briefly states, a disc player has a magazine for storing discs and a disc transport mechanism transporting a selected disc between a playback position outside the magazine and a store position located entirely within the magazine. The carriages are stacked upon each other and pivotally supported within the magazine. The carriages are extracted from the stack by lifting a front end of a carriage above a selected carriage. Subsequent to the lifting of the carriage, the selected carriage is withdrawn from the magazine to the playback position. When a selected carriage is moved to the playback position, the discs on carriages above and below the selected carriage are prevented from shifting with the removal of the selected carriage by coaxial opposing shafts which extend through spindle holes in the discs on the carriages above and below the selected disc. A closeable gap between the two shafts permits the selected disc to be shifted. The gap is closed, except when a carriage is being shifted into or out of the magazine, thereby preventing discs and their carriages from shifting due to vibration or tilting of the cabinet. When the device is in a stop mode, the magazine shifts to pierce any carriages capable of holding discs of different sizes, thereby preventing smaller disc from moving into recesses for larger discs.

According to a preferred embodiment of the invention, there is provided a disc player for storing discs, each having a spindle hole, and playing a selected disc of the discs, comprising a magazine having a plurality of means for holding a disc, a playback position, means for reading said selected disc, of said discs, in said playback position, means for transporting said a selected disc between said playback position and a store position in said magazine, a first shaft extending into said magazine, through said spindle hole of at least one of said discs in said magazine and having an end in said magazine at a first position, a second shaft extending into said magazine, coaxially aligned with and opposing said first shaft, said second shaft extending through said spindle hole of at least another of said discs held in said magazine and having an end in said magazine at a second position, said first and second positions defining a gap, aligned in a common plane with said playback position, allowing said selected disc to be transported between said store position in said magazine and said playback position, and means, responsive to said each of discs in said magazine, for moving said magazine to a predetermined position.

According to a feature of the invention, there is provided a disc player for storing discs, each having a spindle hole, and playing a selected disc of the discs, comprising a magazine having means for storing said discs, a playback position, means for reading said selected disc, of said discs, when said selected disc is moved to said playback position, means for transporting said selected disc between said playback position and a store position within said magazine, a first shaft extending into said magazine, through said spindle hole of at least one of said discs held in said magazine and having an end in said magazine at a first position, a second shaft extending into said magazine coaxially aligned with and opposing said first shaft, means for slidably mounting said second shaft, said second shaft extending through said spindle hole of at least another of said discs held in said magazine and having an end in said magazine at a second position, said first and second positions defining a gap, aligned in a common plane with said playback position, allowing said selected disc to be transported between said store position in said magazine and said playback position, locking means for shifting said second shaft in an axial direction to a lock position, closing said gap, thereby securing said discs in said magazine by extensions of each of said first and second shafts through spindle holes of said discs, said locking means including means for biasing said second shaft toward said first shaft and means for displacing said second shaft, in a direction opposing said means for biasing, a distance effective for permitting only said selected disc to pass therebetween, and means for moving, responsive to each of said discs being in said magazine, said magazine to a predetermined position such that one of said first and second shafts pierce said spindle hole of selected ones of said discs.

According to a further feature of the invention, there is provided a magazine for storing discs, each having a spindle hole, comprising means for holding said discs in a concentric array with said spindle holes aligned, a shaft extending through said spindle holes of said discs to secure said discs in said magazine, means for slidably mounting said shaft, means for retracting said shaft, at least partially from said magazine, to allow withdrawal or insertion of a single disc at a time in said magazine, and means, responsive to said discs being in said magazine, to move said means for holding discs such that said shaft pierces predetermined ones of said discs through said spindle holes.

According to a still further embodiment of the invention, there is provided a disc playback device, comprising a magazine, said magazine including at least one means for holding a disc of a first size, said magazine including at least one means for holding a disc of a second size, a playback position, each of said discs in said magazine having a store position disposed substantially in a plane defined by said playback position, a first shaft, extending downward from a top portion of said magazine, extending through said spindle holes of said discs disposed in said magazine above said plane to secure said discs in said magazine, a second shaft, extending downward from a bottom portion of said magazine, extending through said spindle holes of said discs disposed in said magazine below said plane to secure said discs in said magazine, retracting means for shifting said second shaft axially to lock with said first shaft to secure all discs in said magazine, means, responsive to a stop mode of operation, for moving said magazine to a rest position where one of said first and second shafts pierce said at least one means for holding a disc of a second size.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
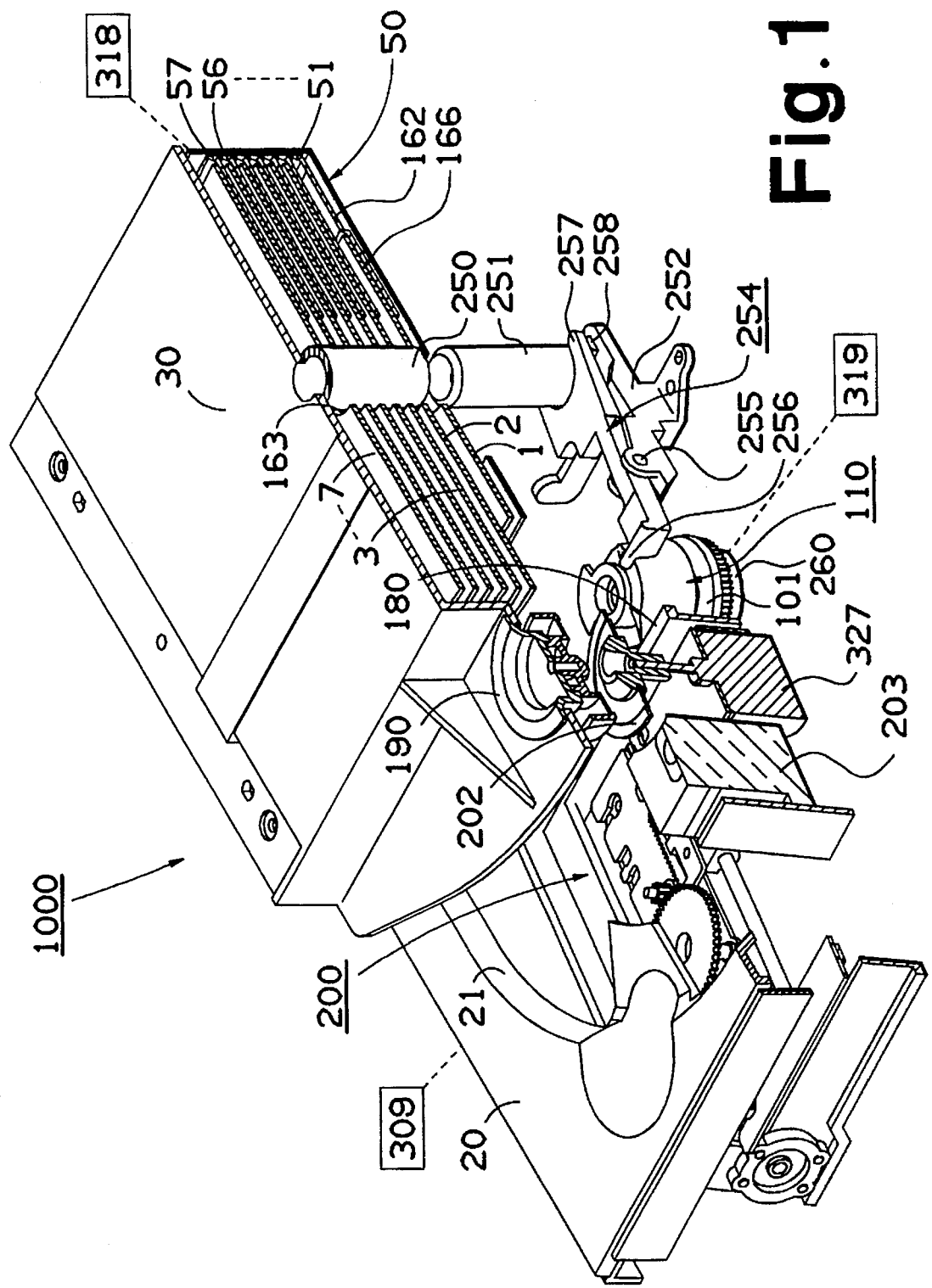
FIG. 1 is a cross-section perspective drawing of the present disc playback device in a stop mode, in which the magazine is in a first position. Pos(1).
Figure 5:
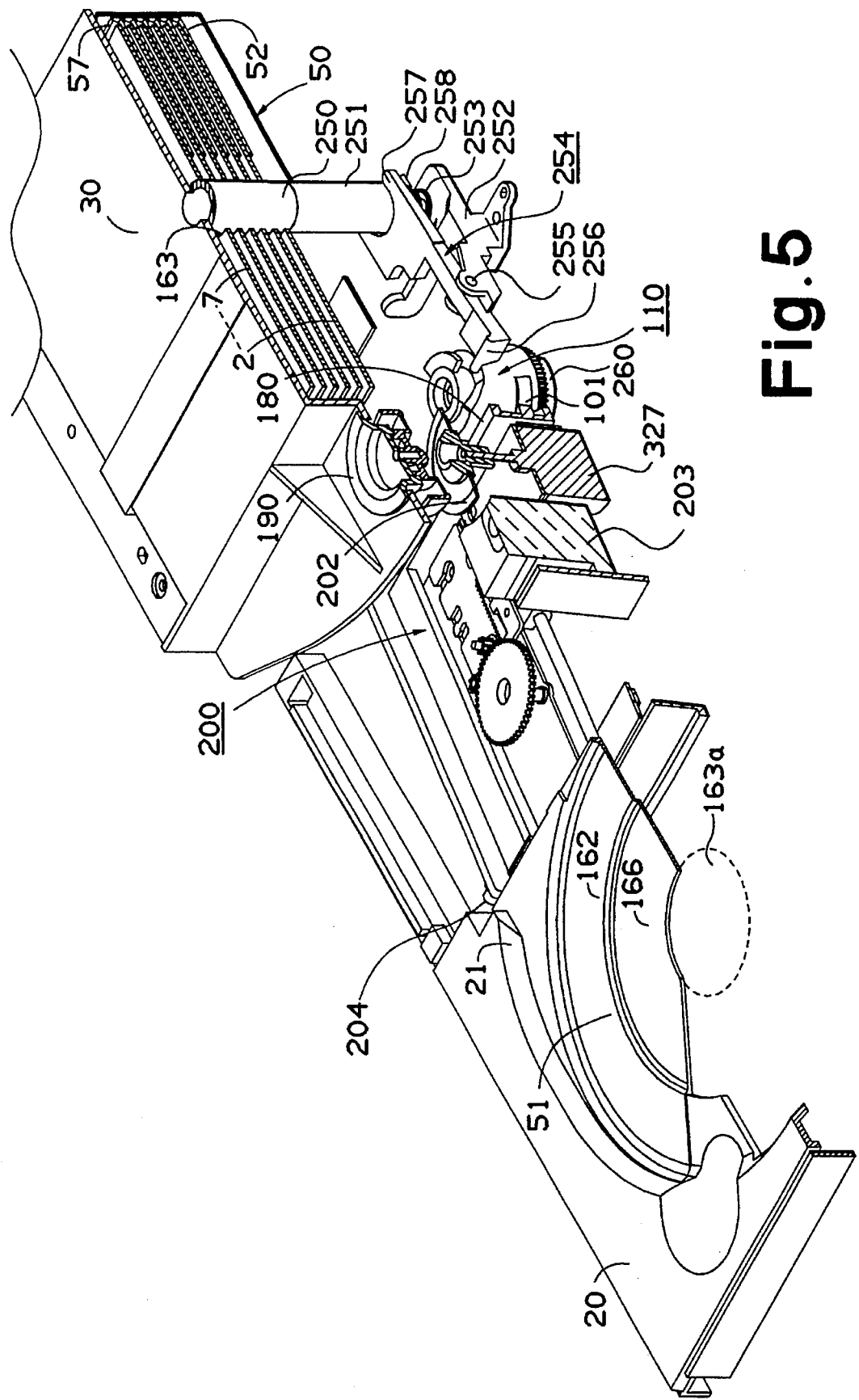
FIG. 5 is a cross-section perspective drawing of the present disc playback device in an eject position.

Referring to FIGS. 1 and 5, a disc playback device, shown generally at 1000, includes a magazine 50 which holds seven carriages 51–57 for carrying discs. Each carriage 51–57 has a 12 cm diameter first recess 162 for receiving individual compact discs. First carriage 51, located in the lowest level of magazine 50, also has an 8 cm diameter second recess 166 for smaller discs. The seven carriages 51–57 are stacked in contact with each other in the magazine 50.

Figure 2:
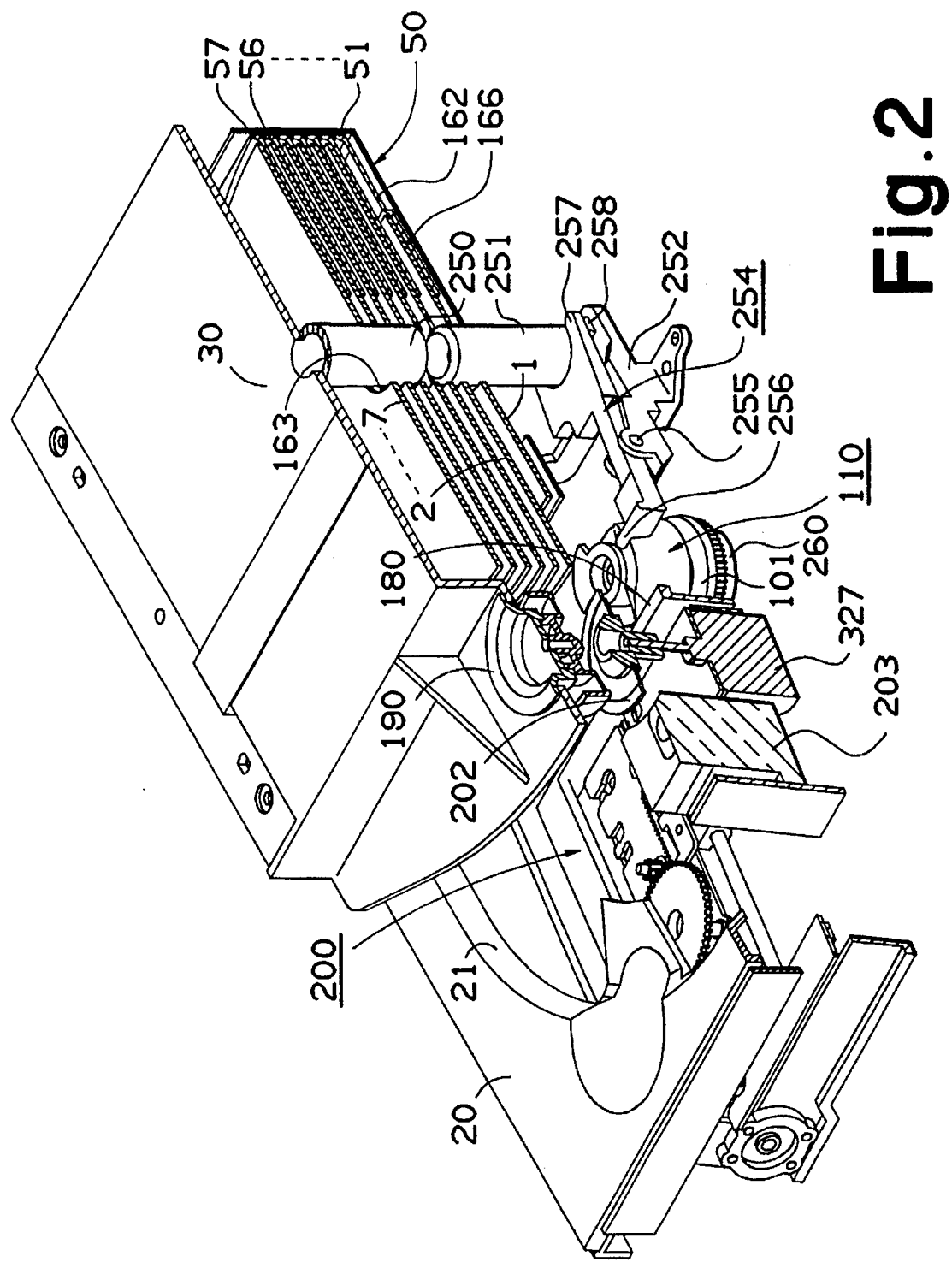
FIG. 2 is a cross-section perspective drawing of the present disc playback device in a stop mode, in which the magazine is in a fourth position, Pos(4).

Referring now to FIGS. 1 and 2, a vertical transport mechanism 318 moves magazine 50 vertically to align in a selected one of seven positions, Pos(1)–Pos(7), corresponding to the locations of the seven carriages 51–57 with a store position. The store position is a position of a disc, or carriage, in magazine 50 which is in planar alignment with a playback position above a turntable 202. Once a carriage is aligned with the store position, a tray/carriage transport mechanism 309 can transport the carriage to the playback position for playing. The carriage so moved is known as the selected carriage.

In FIG. 1, magazine 50 is shown in position Pos(1), where first carriage 51 is the selected carriage. In FIG. 2, magazine 50 is shown in position Pos(4), where fourth carriage 54 is the selected carriage. Similarly, a position exists for each of the remaining carriages in magazine 50 corresponding to the store position for each disc.

Figure 3:
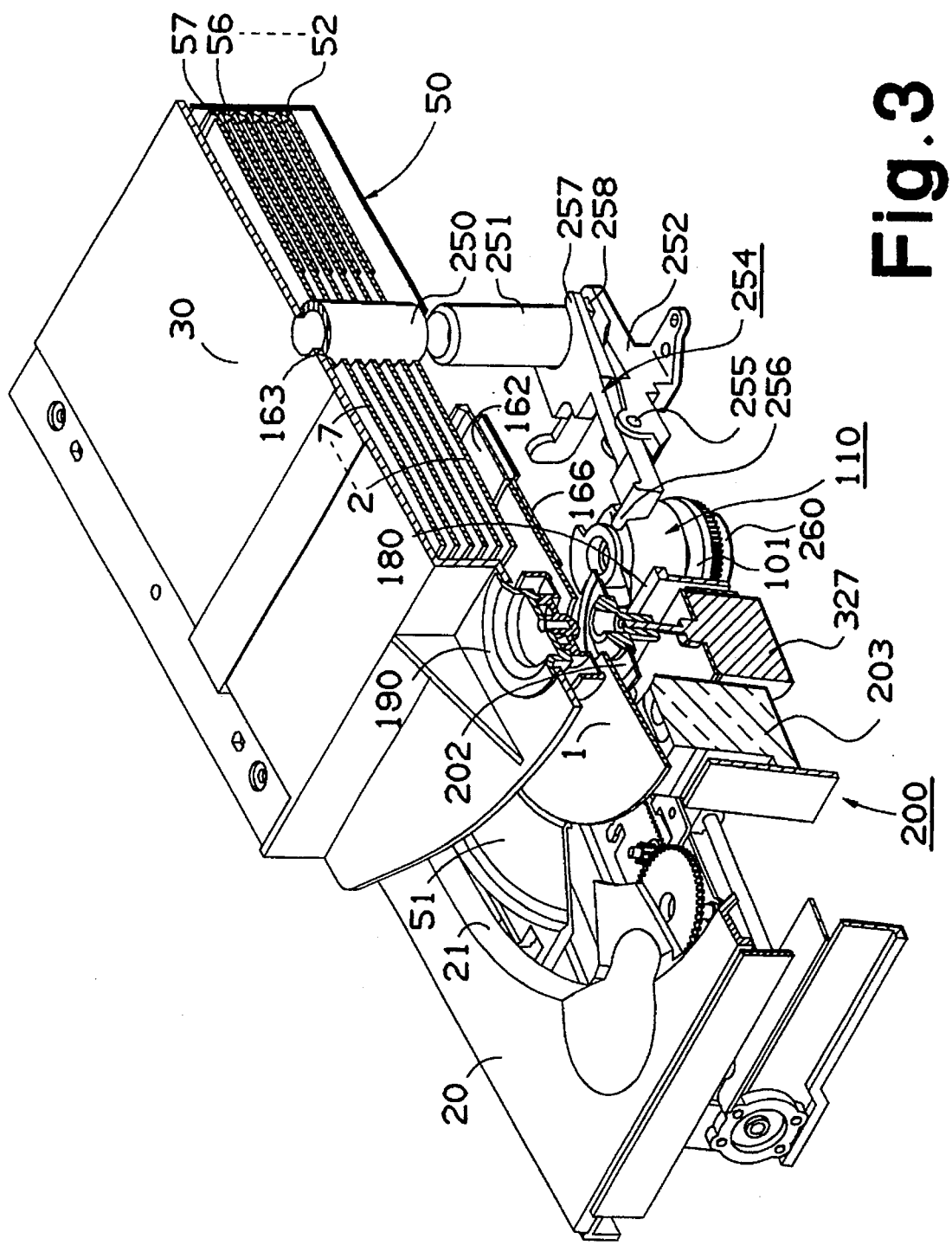
FIG. 3 is a cross-section perspective drawing of the present disc playback device in a center position.

Referring now to FIGS. 1 and 3, first carriage 51 in Pos(1) is transported from magazine 50 by a tray/carriage transfer mechanism 309 to a playback position. To play a disc 1 on selected first carriage 51, an optical mechanism 200 moves upward at the playback position. The motion of optical mechanism 200 clamps disc 1 between turntable 202 and a magnetic clamper 190 and moves an optical head 203 into an operational position. Playback is then performed in a conventional manner.

As first carriage 51 is moved from the store position to the playback position, a carriage lifter (not shown) engages a wedge-shaped portion at a front edge of second carriage 52, located immediately above and adjacent first carriage 51. Third through sixth carriages 53 through 57 are stacked consecutively atop second carriage 52.

The carriage lifter lifts the front edges of second through seventh carriages 52–57, permitting selected first carriage 51 to dismount smoothly from the stack of adjacent carriages within magazine 50. Lifting second carriage 52 provides a space between disc 1 and an overlapping disc on second carriage 52 when first carriage 51 is in the playback position. The space also provides sufficient clearance for magnetic clamper 190 to clamp disc 1. A front edge of a top panel 30, above magazine 50, movably supports magnetic clamper 190.

Although FIG. 3 illustrates movement of the lowest first carriage 51, a similar operation applies for any selected carriage. In second through seventh carriages 52–57, however, the carriage lifter simultaneously applies upward force on carriages above, and downward force on carriages below the selected carriage, thereby raising the upper carriages and preventing lower carriages from dislodging when the selected carriage is withdrawn from magazine 50.

Referring now also to FIG. 5, from the playback position, selected first carriage 51 moves to a load position (not shown) from which it is inserted into a tray 20 (the operations discussed herein apply to any of first through seventh carriages 51–57). Tray/carriage transport mechanism 309 moves tray 20 from the load position to an eject position. In the eject position, the user can remove and replace disc 1 in selected carriage 51. Tray 20 also returns selected carriage 51 to the load position, from which it can move to the playback position or the store position.

After selected first carriage 51 is inserted into tray 20, selected first carriage 51 locks to tray 20 during transport from the load position to the eject position. Selected first carriage 51 disengages from tray/carriage transport mechanism 309 when first carriage 51 locks into tray 20.

Referring now to FIGS. 1–5, an upper disc-lock shaft 250 extends from a lower surface of top panel 30, projecting through both spindle holes 163 of discs 1 stored within magazine 50 and slots 163a of each carriage, which concentrically align with spindle holes 163. A lower end of upper disc-lock shaft 250 projects through slot 163a of the carriage immediately above the selected carriage. For example, in FIG. 2, the lower end of upper disc-lock shaft 250 projects through slot 163a of fifth carriage 54, immediately adjacent and above the selected fourth carriage 54. This prevents discs in the carriages above the selected carriage from moving due to shocks or inclines.

Figure 4:
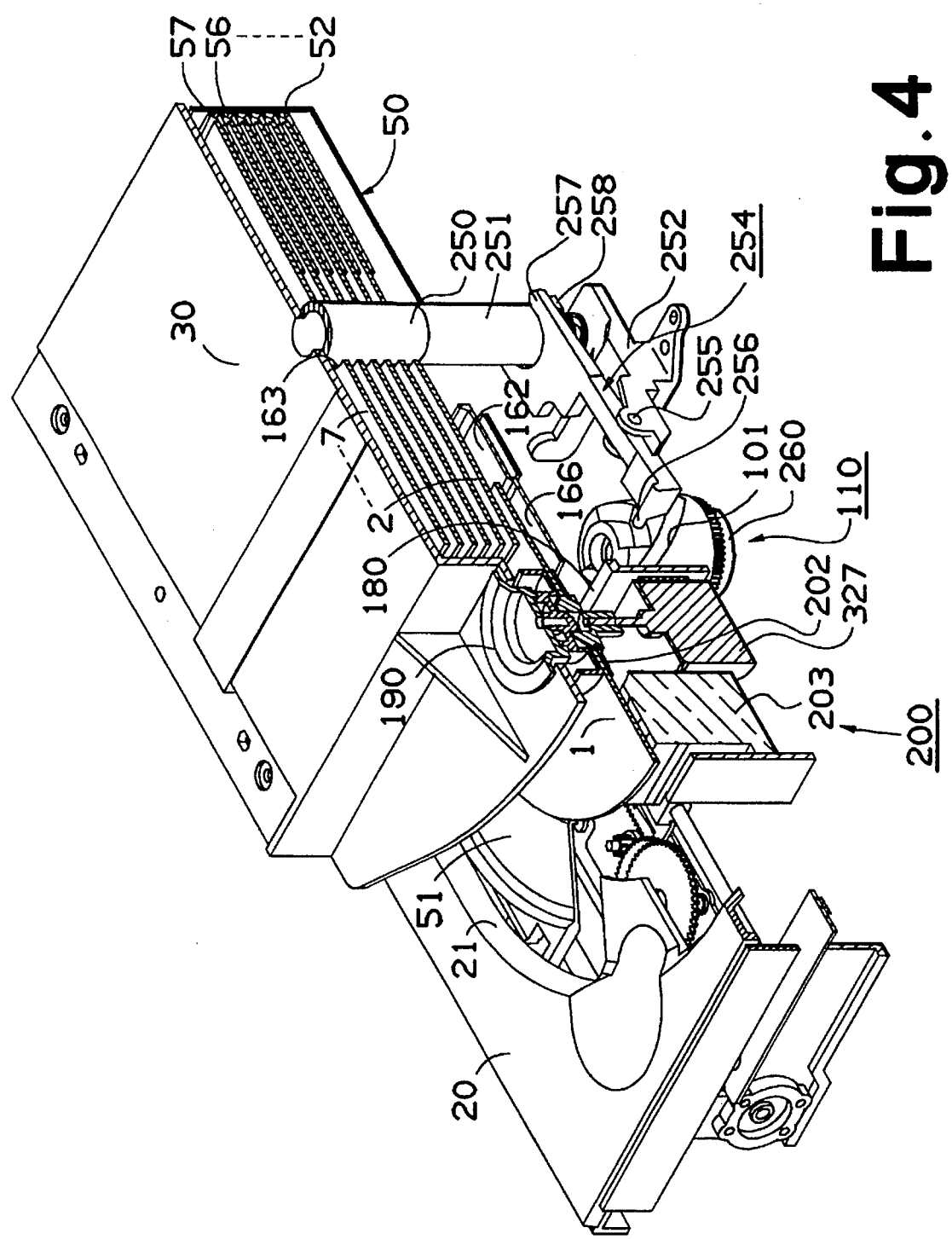
FIG. 4 is a cross-section perspective drawing of the present disc playback device in a center position in which a disc is clamped.

Referring now to FIG. 4 and 5, a support base 252 movably supports a lower disc-lock shaft 251 coaxially opposing upper disc-lock shaft 250. Support base 252 permits lower disc-lock shaft 251 to move vertically as follows. A spring 253, disposed within lower disc-lock shaft 251, applies an upward bias to lower disc-lock shaft 251. A control arm 254 is pivotally mounted on support base 252 by a shaft 255. A follower pin 256 extends from an end of control arm 254 to engage a cam groove 101 in an outer surface of a cam member 110. A cam member drive mechanism 319 drives cam member 110.

Cam groove 101 wraps around cam member 110 in a spiral fashion (most of which is not visible from the vantage point of FIGS. 1–5). A yoke 257, extending from another end of control arm 254, engages an upper surface of a pin 258 projecting from lower disc-lock shaft 251. Rotation of cam member 110 pivots control arm 254, thereby raising and lowering lower disc-lock shaft 251 between a lock position, in which it engages upper disc-lock shaft 250, and an unlock position, in which its upper end retracts below the selected carriage. Thus, lower disc-lock shaft 251 alternately passes through, and out of, spindle hole 163 of the disc on the selected carriage as lower disc-lock shaft 251 moves up and down, respectively.

Optical mechanism 200, positioned below tray 20, is pivotally supported by a pin 204. Pin 204 is horizontally mounted to permit optical mechanism 200 to move in a substantially vertical direction. Optical mechanism 200 includes a base frame 180 from which another pin (hidden behind base frame 180) engages cam groove 101. As a result, rotation of cam member 110 moves optical mechanism 200 vertically.

Optical mechanism 200 moves between an upper position and a lower position. In the upper position, optical mechanism 200 aligns with disc 1 in the playback position. In the lower position, optical mechanism 200 moves below the plane formed by disc 1, thereby freeing the path for transferring selected first carriage 51 into and out of tray 20. A cam 260, integrally formed on a lower portion of cam member 110, engages switches 312–314 that indicate different states of the disc playback device as described below.

Referring now to FIGS. 6–9, cam 260 rotates with cam member 110 to sequentially actuates switches 312–314. Switches 312–314 are precisely positioned at separate locations on a lower surface of a main chassis of the disc playback device 1000. Actuation of switches 312–314 generate signals POS 1–3 (shown in FIG. 9), respectively, which are sent to a system controller 300 (FIG. 10).

A rotational angle of zero for cam 260 is defined as the angle at which rotation of cam 260 lifts optical mechanism 200 into its upper position. Cam groove 101 has a spiral shape so that optical mechanism 200 is advanced when cam member 110 rotates through angles of 0° to −90°. However, there are also non-advancing portions of cam groove 101 where the optical mechanism remains stationary while cam member 101 rotates through angle ranges of +22.5° to 0°, and −90° to −202.5°

Figure 6:
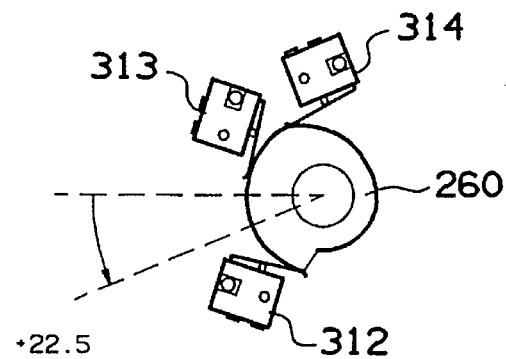
FIG. 6 is a drawing indicating the positional relationship between cam 260 and switches 312–314 at cam angle of +22.5°.
Figure 9:
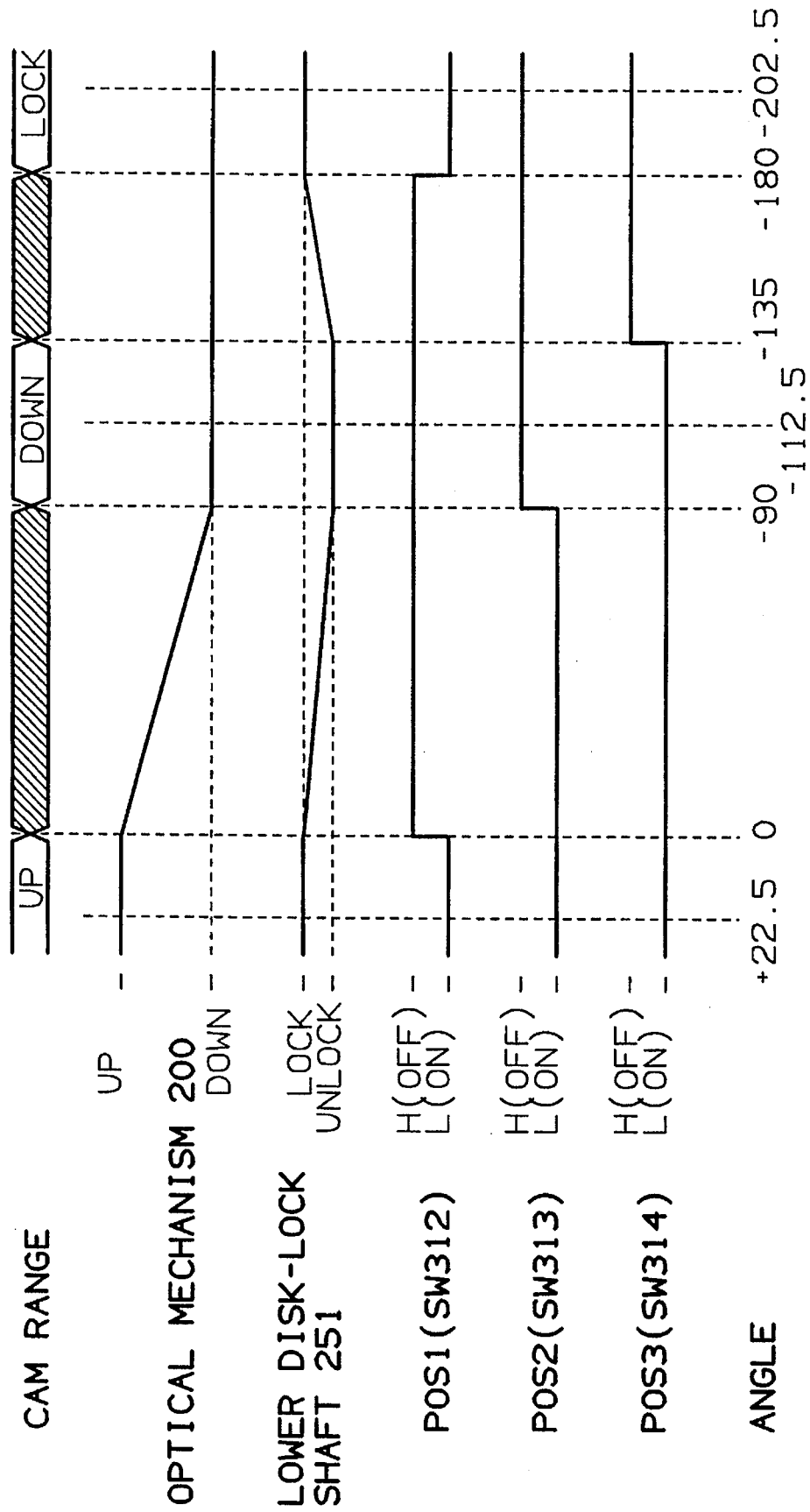
FIG. 9 is a timing chart indicating a relationship between optical mechanism 200, lower disc-lock shaft 251, and cam angle of cam member 110.
Figure 10:
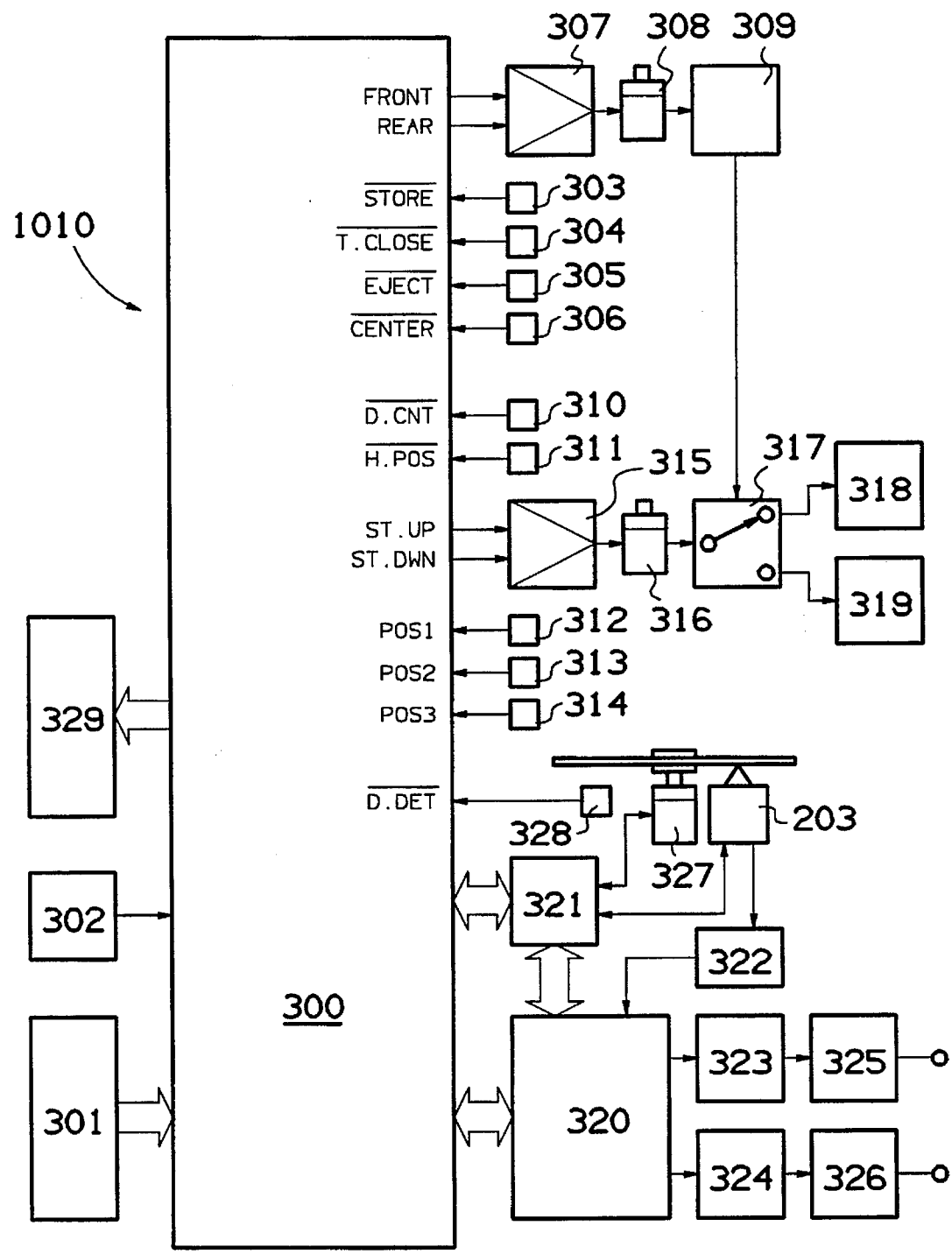
FIG. 10 is a block diagram indicating the control circuit for the present disc playback device.

Referring now to FIGS. 6 and 9, angles of rotation of cam 260 between zero and +22.5°, otherwise known as the UP range, maintains optical mechanism 200 in the upper position and lower disc-lock shaft 251 in the lock position. Switches 312–314 are all turned on, rendering signals POS 1–3 all at a state identified in FIG. 9 as "L" (hereinafter "H" and "L" represent high and low signal level states respectively)

When cam 260 rotates from a cam angle of zero to −90°, optical mechanism 200 moves from its upper to lower position, while lower disc-lock shaft 251 similarly descends from its lock position to an unlock position. During this time, switch 312 is off, and POS 1 signal is "H"

Figure 7:
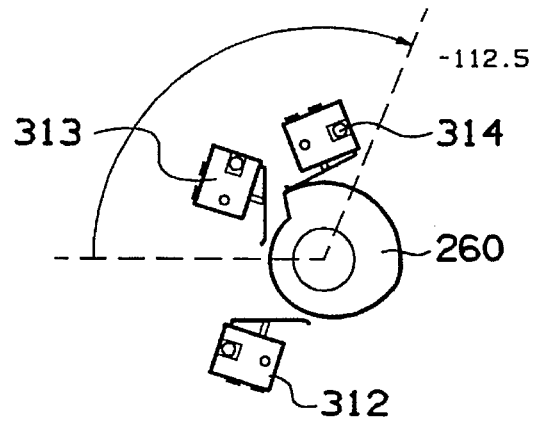
FIG. 7 is a drawing indicating the positional relationship between cam 260 and switches 312–314 at cam angle of −112.5°.

Referring now to FIGS. 7 and 9, at rotational angles between −90° and −135°, otherwise known as the DOWN range, cam 260 turns switches 312 and 313 off, and POS 1 and POS 2 signals are "H". Optical mechanism 200 stays in its lower position while lower disc-lock shaft 251 stays in the unlock position.

Figure 8:
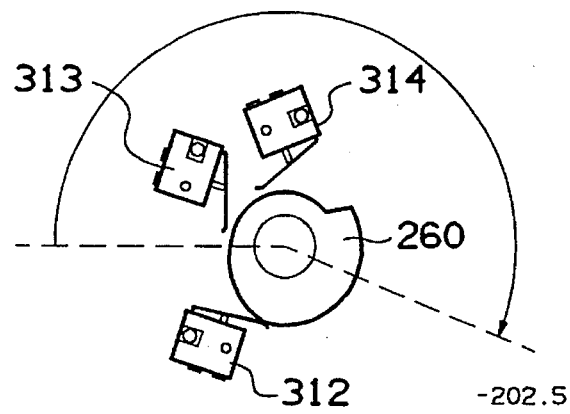
FIG. 8 is a drawing indicating the positional relationship between cam 260 and switches 312–314 at cam angle of −202.5°.

Referring now to FIG. 8 and 9, rotation of cam 260 negatively past −135° turns switch 314 off, rendering all of POS signals 1-3 signal to "H". During this interval, lower disc-lock shaft 251 rises, returning to the lock position when cam member 110 reaches the −180° position. When cam 260 rotates negatively past the −180° point, switch 312 turns on, and signal POS 1 changes to "L". While cam 260 is within the range −180° to −202.5°, otherwise known as the LOCK range, optical mechanism 200 remains in the down position while lower disc-lock shaft 251 remains in the lock position.

Referring now to FIG. 10, a control circuit 1010 includes a system controller 300 optionally having a read-only memory, a random-access memory, and interface circuitry. System controller 300 may also incorporate one or more microprocessors.

System controller 300 controls disc playback device 1000 according to an operating mode set by user input through a mode control panel 301. A backup power supply 302 connects to system controller 300, allowing its random-access memory to retain data when the power supply is turned off or otherwise interrupted.

Limit switches 303–305 apply high "H" and low "L" signal levels to STORE, T.CLOSE, and EJECT inputs of system controller 300, respectively. A "L" signal level at these inputs indicates that tray/carriage transport mechanism 309 has moved the selected carriage to the store, load, and eject positions, respectively. A photo-interrupter 306 detects that tray/carriage transport mechanism 309 has moved the selected carriage to the playback position by applying a signal at a CENTER input of system controller 300.

System controller 300 applies control signals to a motor drive circuit 307 via a FRONT output and a REAR output. A tray motor 308 rotates in forward and reverse directions according to output from motor drive circuit 307. Tray motor 308 drives tray/carriage transport mechanism 309.

According to the preferred embodiment of the invention, tray 20 moves toward the front (toward the eject position) of disc playback device 1000 when an "H" signal level is applied by the FRONT output. Tray 20 moves to the rear (toward the store position) of disc playback device 1000 when an "H" signal level is applied by the REAR output. An the "H" level applied simultaneously by both FRONT and REAR outputs shorts the outputs of motor drive circuit 307, causing a magnetic braking effect in tray motor 308. When both outputs are held at the "L" level, the outputs of motor drive circuit 307 are open.

System controller 300 has several additional inputs for receiving input signals. A D.CNT input, connected to a photo-interrupter 310, receives an input signal indicating the position of magazine 50. An H.POS input, connected to a limit switch 311, receives an input signal that detects a reference position of magazine 50. Inputs POS 1-3 are connected to switches 312–314. Inputs POS 1-3 receive signals that indicate the position of cam 260, as described above.

Figure 11:
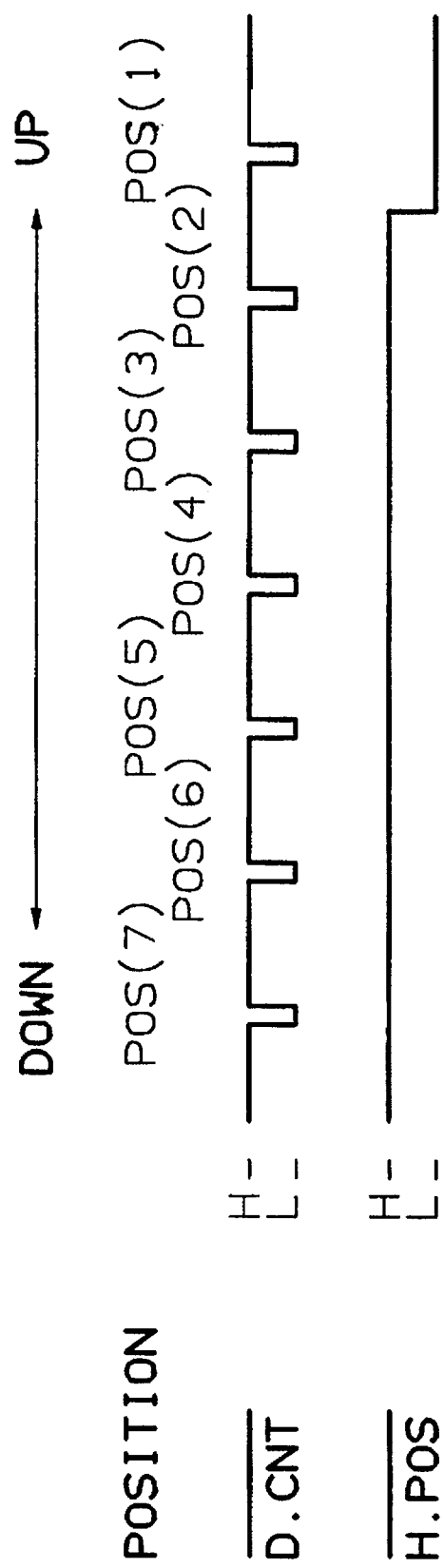
FIG. 11 is a timing chart indicating changes in a D.CNT signal and the H.POS signal relative to the position of the magazine.

FIG. 11 shows the changes in D.CNT signal and H.POS signal corresponding to the position of magazine 50. The D.CNT signal outputs a brief "L" each time magazine 50 brings a disc into its respective position Pos(n) (where n is the disc number). The H.POS input normally remains at "H", except when magazine 50 is roughly midway between Pos(1) and Pos(2), at which point H-POS becomes a "L".

Simultaneous reception of a "L" at both the H.POS and D.CNT inputs indicates to system controller 300 that magazine 50 is at Pos(1). This condition acts as a home-position signal. The remaining positions are detected by counting the D.CNT signal as magazine 50 moves in a given direction.

Returning now to FIG. 10, system controller 300 applies a signal level to an ST.UP output and an ST.DWN output. The ST.UP and ST.DWN outputs are connected to a motor drive circuit 315. Motor drive circuit 315 controls a magazine motor 316, which rotates in a reverse direction in response to the output from motor drive circuit 315. The rotary output of magazine motor 316 transmits, via a selection mechanism 317, to either magazine vertical transport mechanism 318 or cam member drive mechanism 319. Selection mechanism 317 is controlled by tray/carriage transport mechanism 309 in response to the position of the selected carriage.

When a selected carriage 51-57 is in the store position, magazine vertical transport mechanism 318 is selected. Magazine 50 moves upward when the ST.UP signal is "H" and moves downward when the ST.DOWN signal is "H". When both signals are "H," motor drive circuit 315 outputs short, applying a magnetic brake to magazine motor 316. When both signals are "L," motor drive circuit 315 outputs disconnect, releasing the magnetic braking action.

Selection mechanism 317 transfers rotary input to cam member drive mechanism 319 when a selected carriage is in a position other than the store position (i.e., the playback or eject position). If the ST. UP signal is "H", cam 110 turns clockwise, moving optical mechanism 200 downward. If the ST.UP signal is "H," cam 110 turns counter-clockwise, moving optical mechanism 200 upward.

System controller 300 also has a D.DET input to which signals are applied by a disc sensor 328 to register in memory the presence of a disc 1 in a selected carriages.

Optical head 203 is movably connected to optical mechanism 200. Optical head 203 uses a laser to read recorded information from disc 1, generating a playback signal responsively to information recorded therein. The playback signal is applied to signal processor circuit 320 via a RF amplifier 322. Signal processor circuit 320 generates Lch and Rch audio data following EFM demodulation, de-interleaving and error correction to the raw signal. Audio data are sent to digital-to-analog converters 323 and 324, respectively, for digital-to-analog conversion. The analog output signals are applied to low pass filters 325 and 326, respectively.

System controller 300 connects to a servo signal processor circuit 321, which controls a focus servo, a tracking servo and a feed servo on optical head 203. Servo signal processor circuit 321 also controls a CLV servo of a spindle motor 327.

The operation of system controller 300 in conjunction with the remaining elements of the disc playback device are shown in the flowcharts of FIGS. 12–22, and the corresponding time charts shown in FIGS. 23–29. In the flowcharts, "n" refers to the selected disc number (carriage number) set responsive to a disc selection key, while "m" refers to the current position of magazine 50. Flag(m) indicates the presence of a disc on the mth storage position of magazine 50, where m is an index indicating the storage position number (e.g. Flag(3)=1 indicates that a disc is present in third carriage 53).

Figure 12:
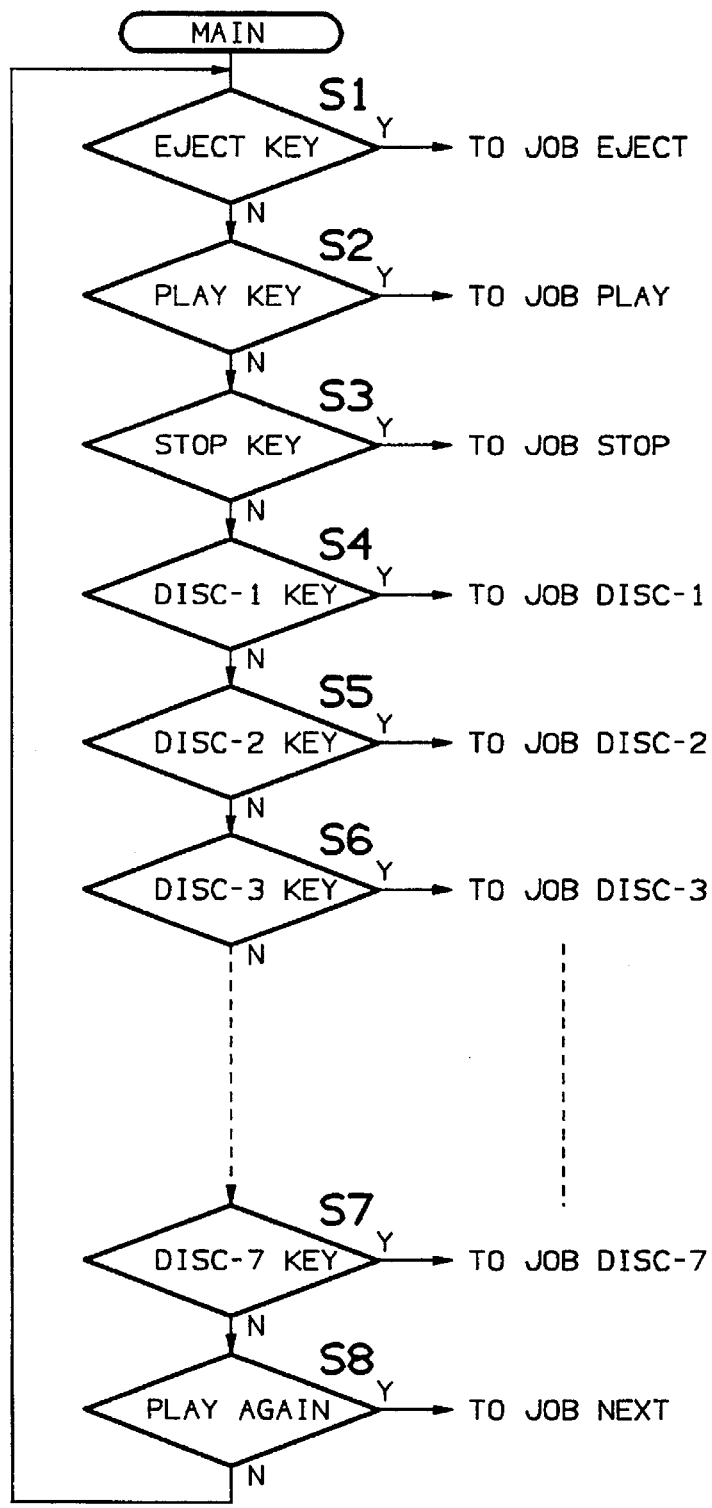
FIG. 12 is a flowchart showing the MAIN routine for system controller 300.

Referring now to FIG. 12, system controller 300 follows the operation in the MAIN flowchart, in which system controller 300 awaits depression of a command key, or the completion of the playback mode for a disc. Each of the functions shown in FIG. 12 is referred to in the detailed flow descriptions of later figures. Thus, further description of FIG. 12 is unneccesary, and is omitted.

Figure 13:
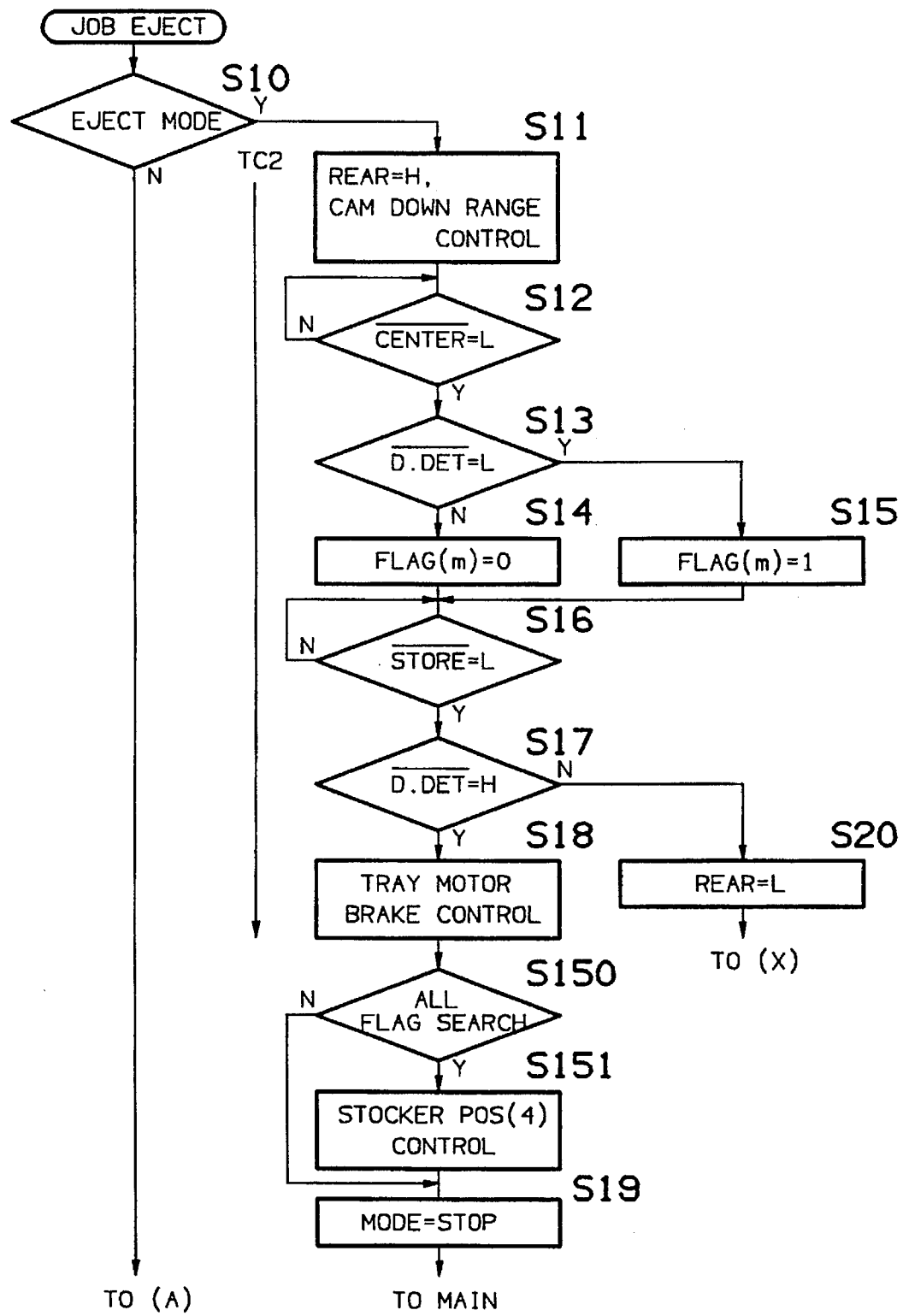
FIG. 13 is a flowchart showing the JOB EJECT routine.
Figure 14:
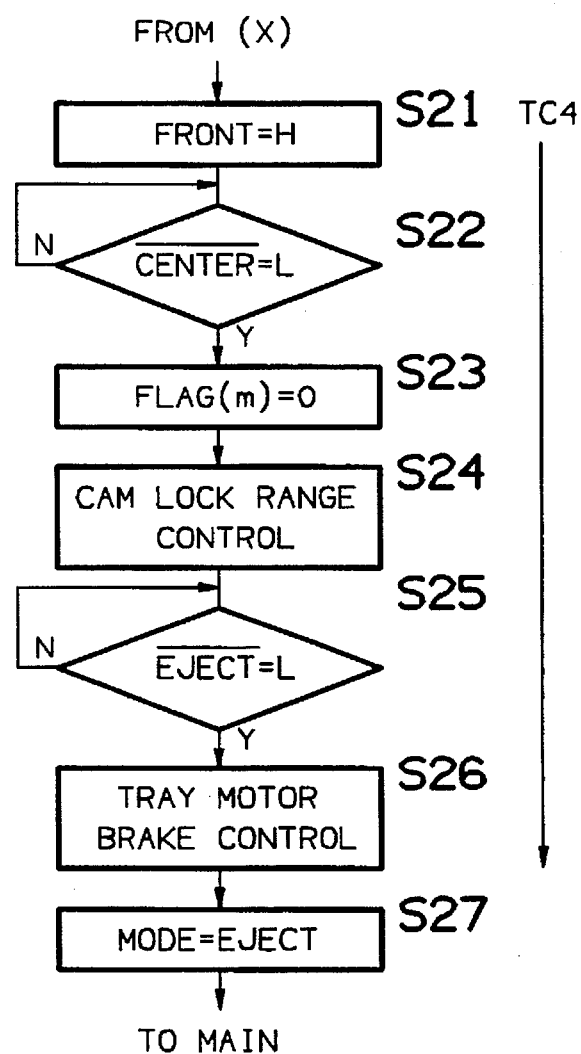
FIG. 14 is a flowchart showing the JOB EJECT routine.
Figure 15:
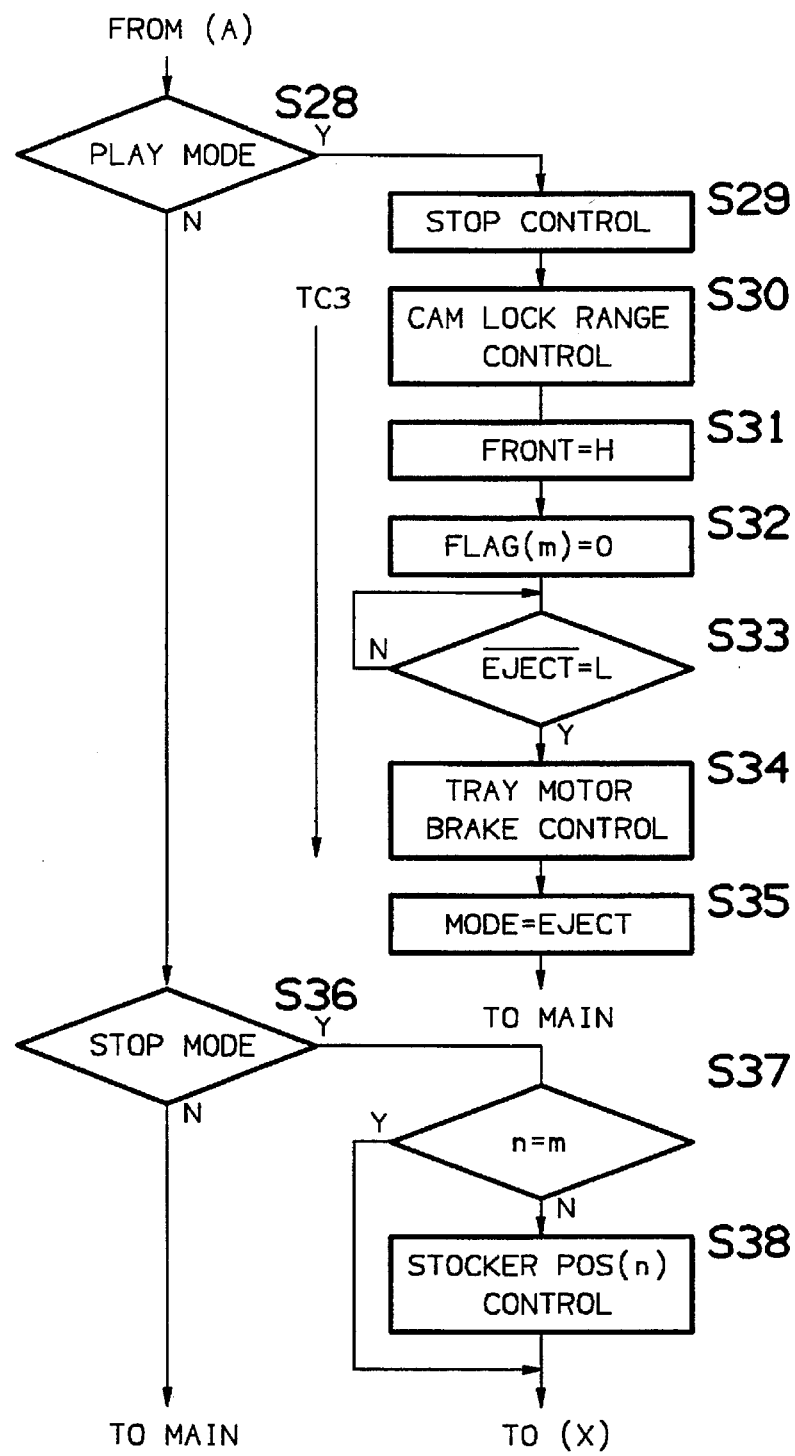
FIG. 15 is a flowchart showing the JOB EJECT routine.

Referring now to FIGS. 13–15, when an eject key is pressed while tray 20 is in the eject position, control by system controller 300 passes from step S1 of FIG. 12 to step S11 of FIG. 13. Step S10 is the first step in a JOB EJECT routine, shown in FIG. 11. Beginning with step S11, The JOB EJECT routine proceeds through operation TC2 of FIG. 23. Operation TC2 details how the device goes from the eject mode to the stop mode by returning the tray to the load position and the selected carriage to the store position.

In step S11, system controller 300 applies the "H" level is to the REAR output to retract tray 20 toward its close position. Simultaneously, cam member 110 rotates toward the DOWN range shown in FIG. 9. Cam member 110 rotates counterclockwise responsive to a "H" level to the ST.DWN output. This also moves lower disc-lock shaft 251 downward from the lock position (indicated in FIG. 5).

When lower disc-lock shaft 251 arrives at the unlock position and the POS 3 signal is set to "L" as a result of the rotation of cam 260, system controller 300 activates the electromagnetic brake for motor 316 by applying the "H" level to the ST.UP output to short motor drive circuit 315 for 50 msec. Following the first application of the brake, system controller 300 proceeds to step S12 unless cam member 110 over-rotates past the DOWN range.

If cam member 110 over-rotates beyond the desired range, system controller 300 applies the "L" level to the ST.DWN output, driving cam member 110 clockwise. When the POS 2 signal changes to "H," system controller 300 sets the ST.DWN signal to "H", magnetically braking magazine motor 316 for 50 msec.

At step S12, system controller 300 waits for the CENTER input signal to change to "L" in response to photo-interrupter 306. The CENTER input changes upon arrival of the selected carriage at the playback position. Once tray 20 is in the load position and the selected carriage disengages tray 20, the "L" level is applied to the CENTER output by switch 313. When the CENTER output signal changes to "L," control passes to step S13 where system controller 300 determines if a disc is present in the selected carriage.

The presence (or lack thereof) of a disc in the selected carriage is indicated by the D.DET signal. If a disc is present, the D.DET signal is "L," and the corresponding FLAG(m) is set to "1" at step S15. A D.DET signal of "H" indicates the absence of a disc, and FLAG(m) is set to "0" at step S14. After setting FLAG(m), system controller 300 waits for the STORE signal to change to "L" at step S16, which indicates that the selected carriage has returned to magazine 50.

On occasion, two discs may be placed accidentally into a tray 20 while in the eject position. If two discs 1 were set in selected first carriage 51, the top disc would hit a rim 21 of tray 20 when selected first carriage 51 moves from the playback position to the store position. Once selected carriage 51 withdraws to its store position, the top disc would fall into tray 20, jamming the device and damaging the disc when magazine 50 moves.

In order to prevent such damage, the present invention checks to ensure that tray 20 is clear before moving magazine 50. Following a "L" STORE signal, system controller 300 again checks the D.DET signal at step S17.

If the D.DET signal is "H" (no disc present in tray 20), control passes to step S18 (the last step of Operation TC2), where system controller 300 activates the electromagnetic brake for motor 316 by setting FRONT output signal to "H", shorting the input leads to magazine motor 316 for 50 msec.

At step S150, each Flag(m) is checked to determine if any discs are stored in magazine 50. If a Flag is detected, then magazine 50 moves to POS(4) at a step 151, thereby securing any 8 cm disc in first carriage 51 such that it cannot slip into the larger 12 cm cavity. Finally, at step S19, a MODE variable is set to indicate a "STOP" mode and control returns to the MAIN routine of FIG. 10.

If D.DET signal is "L" at step S17, indicating the presence of a disc, system controller 300 sets the REAR signal to "L" at step S20 and control passes to step S21 of FIG. 14. Beginning with step S21, the JOB EJECT routine proceeds through operation TC4 of FIG. 24. Operation TC4 details how the device secures the magazine prior to entering into the eject mode.

Referring now also to FIG. 14, at step S21, system controller 300 sets the FRONT signal to "H", moving selected first carriage 51 toward the playback position. CENTER input signal changes to "L", indicating arrival of selected first carriage 51 at the playback position, at a step S22. Once CENTER input signal changes to "L", system controller 300 resets FLAG(m) to "0" at a step S23.

At a step S24, system controller 300 moves cam member 110 to the LOCK range. ST.UP is set to "H," rotating cam member 110 clockwise to move lower disc-lock shaft 251 toward the lock position. Once lower disc-lock shaft 251 moves to the lock position and the POS 1 signal is "L", the ST.DWN output signal is set to "H" to brake magazine motor 316. In this state, the remaining discs in magazine 50 are secure, and will not shift due to shock or inclination of playback device 1000.

Then, at step S25, system controller 300 waits for the EJECT signal to change to "L" when tray 20 is brought to the eject position. System controller 300 applies the "H" level to the REAR output and magnetically brakes tray motor 308 for 50 msec. At step S27, the MODE variable is set to indicate an "EJECT" mode and control is returned to the MAIN routine.

Figure 25:
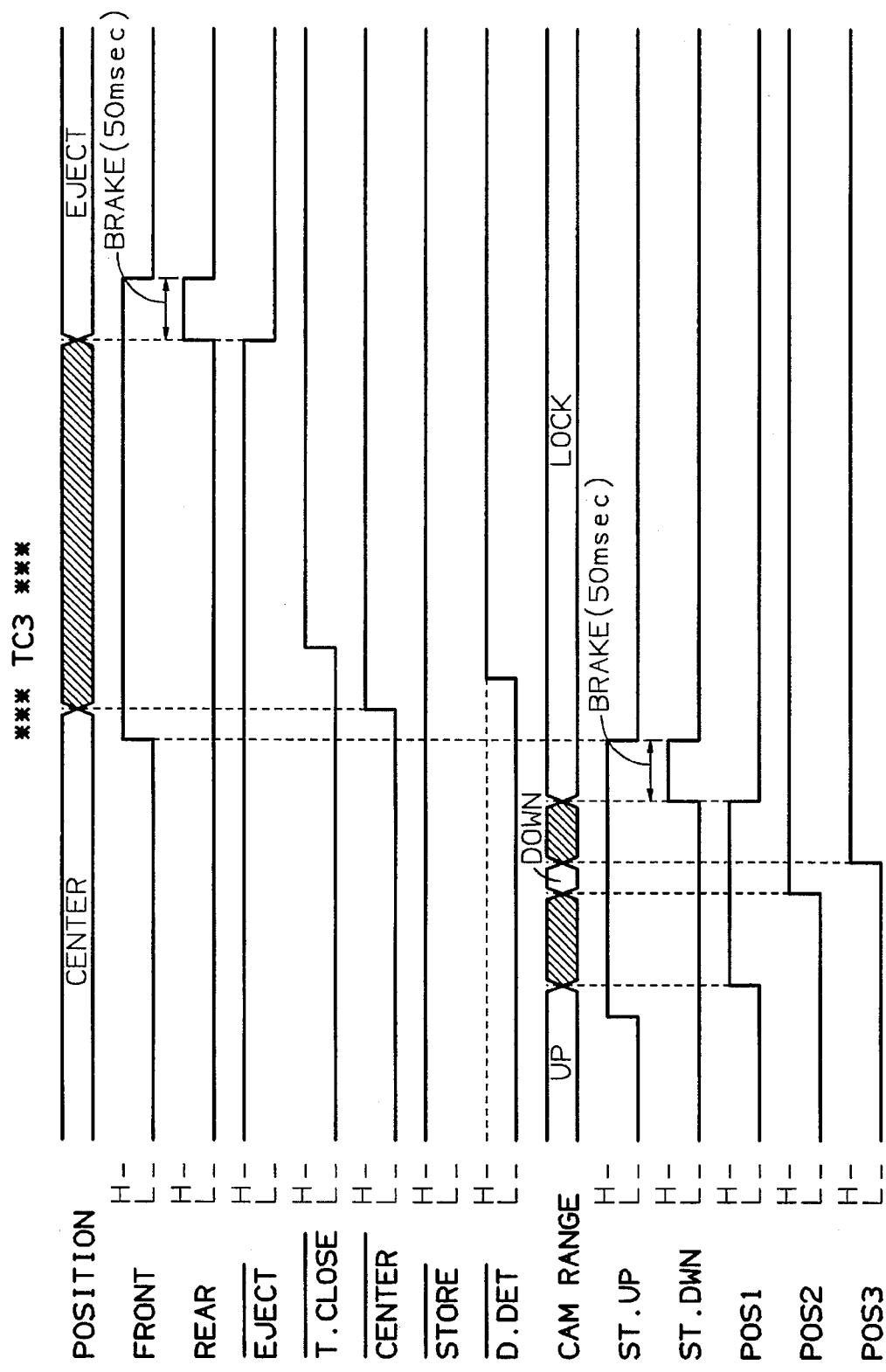
FIG. 25 is a timing chart TC3 used in describing a portion of the steps found in the flowchart in FIG. 15.

Referring now to FIGS. 15 and 25, when the eject key is pressed during a "PLAYBACK" mode, system controller 300 proceeds from step S1 of FIG. 12 through step S10 of FIG. 13 to steps S28 and S29 of FIG. 15. At step S30, disc playback is halted and cam member 110 rotates to the LOCK range shown in FIG. 9. Beginning with step S30, The JOB EJECT routine proceeds through operation TC3 of FIG. 25. Operation TC3 details how the device secures the magazine prior to ejecting a disc from the playback position.

System controller 300 applies an "H" level to the ST.UP output. System controller 300 then rotates cam member 110 clockwise to bring optical mechanism 200 into the lower position and lower-disc-lock shaft 251 to the lock position. Once lower disc-lock shaft 251 arrives at the lock position and the POS 1 signal becomes "L", motor 316 magnetically brakes for 50 msec by a "H" ST.DWN signal.

Following braking, an "H" level signal is applied to the FRONT output at a step S31, moving tray 20 to the eject position. At step S32, FLAG(m) is reset to "0" After tray 20 arrives at the eject position, causing the EJECT input signal to change to "L", an "H" level at the REAR output magnetically brakes tray motor 308 for 50 msec. Finally, the MODE variable is set to indicate the "EJECT" mode and control returns to the MAIN routine of FIG. 10 in a step S35.

When the eject key is pressed during the "STOP" mode (the mode when all carriages 51–57 are in the store position), system controller 300 proceeds from step S1, through steps S10, S28, S36 to step S37, at which the selected disc number "n" is compared with "m". If they are identical, control proceeds to the flowchart of FIG. 14, described as previously. If not, magazine 50 moves to Pos(n) prior to control proceeding to the flowchart of FIG. 14.

Figure 16:
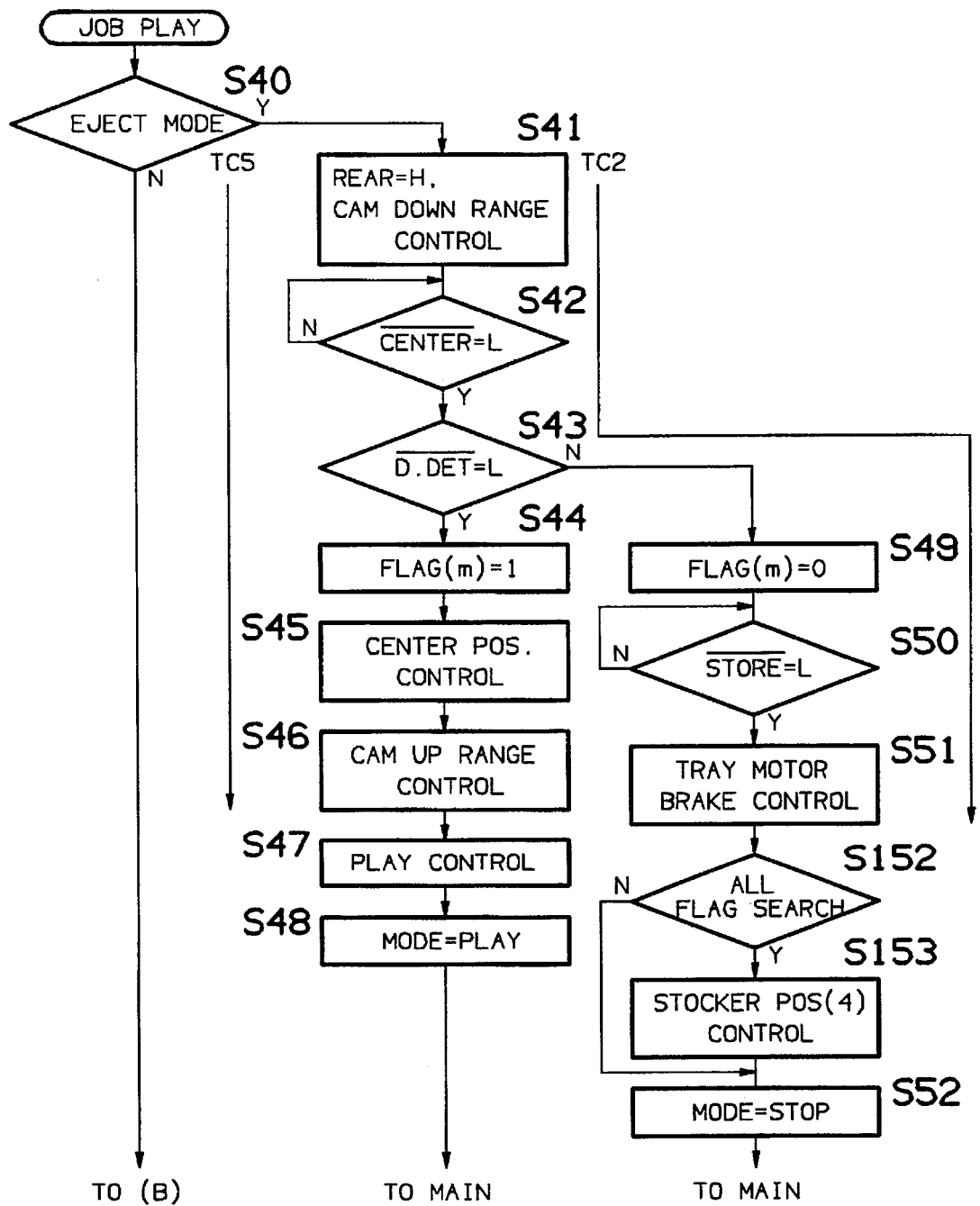
FIG. 16 is a flowchart showing the JOB PLAY routine.
Figure 26:
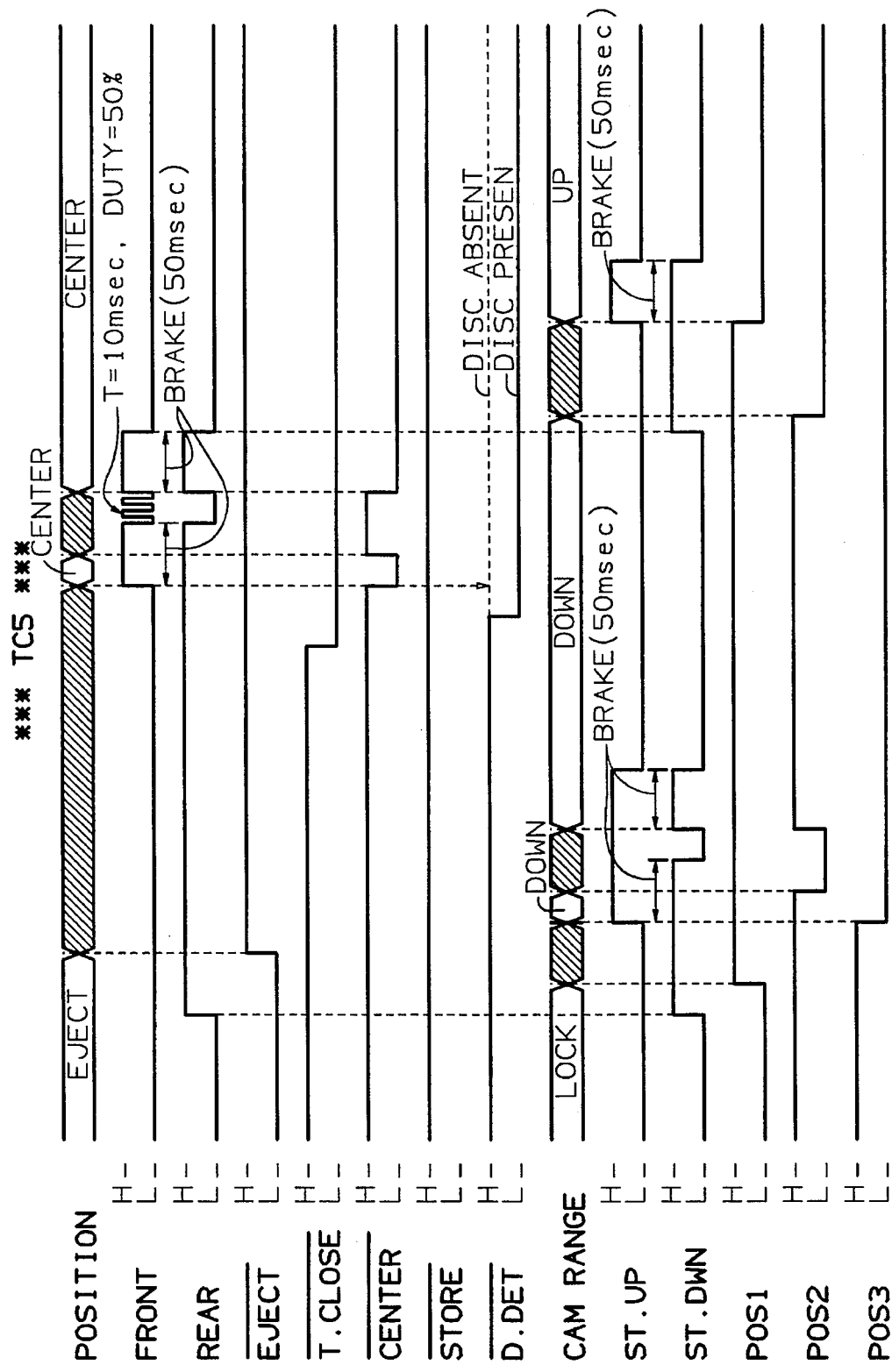
FIG. 26 is a timing chart TC5 used in describing a portion of the steps found in the flowchart in FIG. 16.

Referring now to FIG. 16 and 26, when a play key is pressed during the "EJECT" mode, system controller 300 proceeds from step S2 of FIG. 10 to steps S40 and S41 of FIG. 16. At step S41, an "H" level to the REAR output moves tray 20 toward its close position. At the same time, cam member 110 rotates counterclockwise to the DOWN range, moving lower disc-lock shaft 251 downward from the lock position (indicated in FIG. 5). When lower disc-lock shaft 251 arrives at the unlock position and the POS 3 signal is set to "L" as a result of the rotation of cam 260, system controller 300 activates the electromagnetic brake for motor 316 by applying the "H" level to the ST.UP output to short motor drive circuit 315 for 50 msec. Following the first application of the brake, system controller 300 proceeds to step S42 (unless cam member 110 over-rotates, thereby requiring restoration in the manner described previously).

At step S42, system controller 300 waits for the CENTER input signal to change to "L," in response to photo-interrupter 306. When the CENTER output signal changes to "L," control passes to step S43 where system controller 300 determines if a disc is present in the selected carriage. If a disc is present, the D.DET signal is "L," and the corresponding FLAG(m) is set to "1" at step S15. Tray 20 moves to the playback position at step S45. When the CENTER input signal terminal state changes to "L," system controller 300 outputs an "H" signal level from the FRONT output braking tray motor 308 for 50 msec.

After braking, if tray motor 308 rotated past the playback position, an "L" level is output from the REAR output, and the FRONT output is cycled between "H" and "L" with a 50% duty cycle and a cycle period of 10 msec. Selected first carriage 591 thus moves in the eject direction at a low speed. Once the CENTER input signal changes to "L," an "H" level is output from both the FRONT and the REAR output terminals braking tray motor 308 for 50 msec.

At step S46, system controller 300 brings cam member 110 to the UP range, shown in FIG. 9. An "H" signal level is applied by the ST.DWN output, rotating cam member 110 counterclockwise. Optical mechanism 200 moves toward its upper position, whereupon the POS 1 signal changes to "L". Magnetic braking is activated by an "H" level signal is output from the ST.UP. After the braking, signal processor circuit 320 and servo signal processor 321 are controlled to begin the playback procedure at step S47. Once disc playback has begun, the MODE variable is set to indicate the "PLAY" mode and control returns to the MAIN routine at step S48.

If no disc is present in the selected carriage (D.DET is "H"), control proceeds from step S43 to step S49. FLAG(m) is set to "0" At step S50, system controller 300 waits for the selected carriage to arrive at the store position and the STORE input signal changes to "L", at which time system controller 300 outputs an "H" level at the FRONT output at step S51 to brake tray motor 308. At step S152, each Flag(m) is checked to determine if any discs are stored in magazine 50. If a Flag is detected, then magazine 50 moves to POS(4) at a step 153, thereby securing any 8 cm disc is first carriage 51 such that it cannot slip into the larger 12 cm cavity.

Finally, at step S52, a MODE variable is set to indicate a "STOP" mode and control returns to the MAIN routine of FIG. 12.

Figure 17:
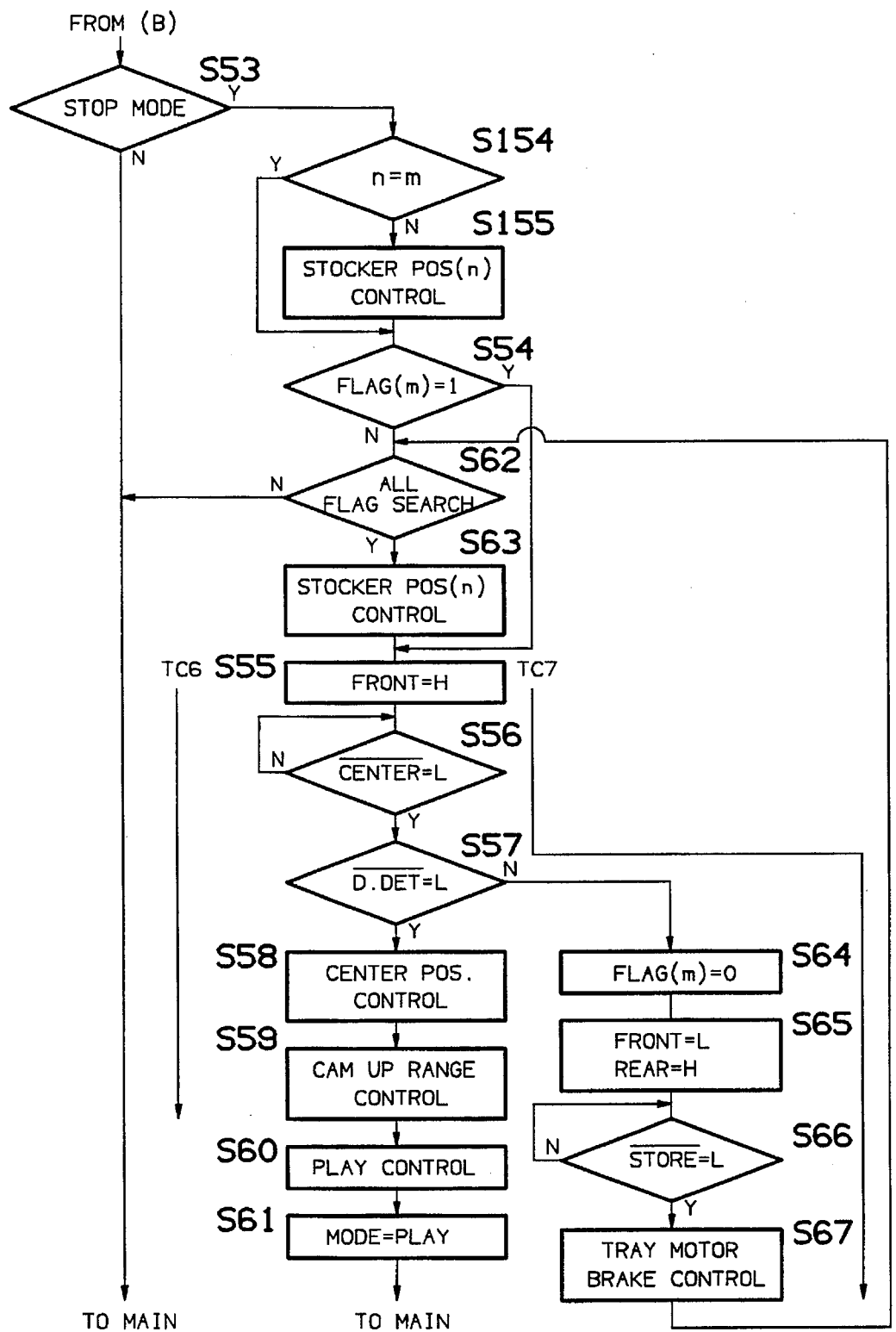
FIG. 17 is a flowchart showing the JOB PLAY routine.
Figure 27:
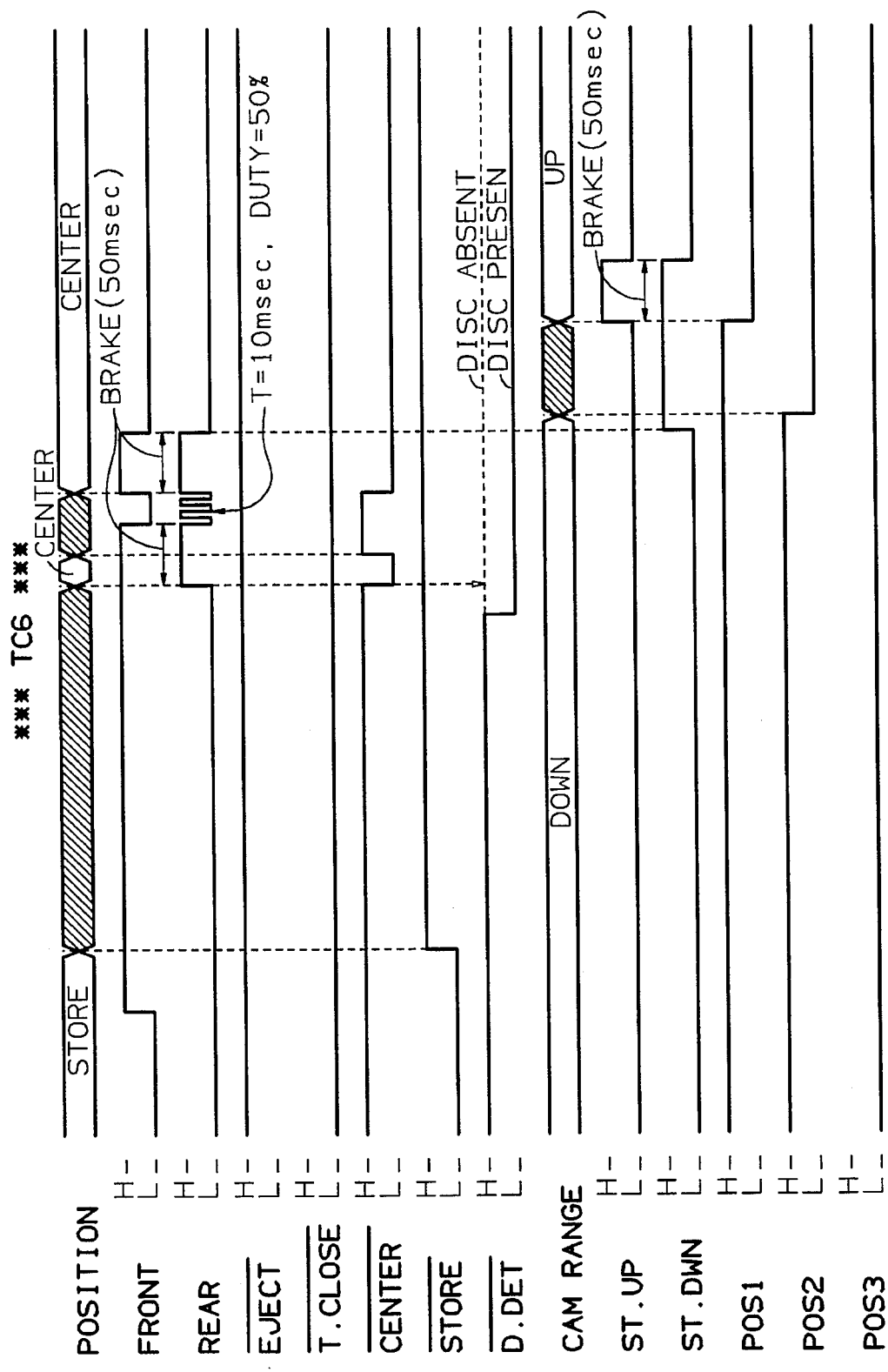
FIG. 27 is a timing chart TC6 used in describing a portion of the steps found in the flowcharts in FIGS. 17, 21 and 22.
Figure 28:
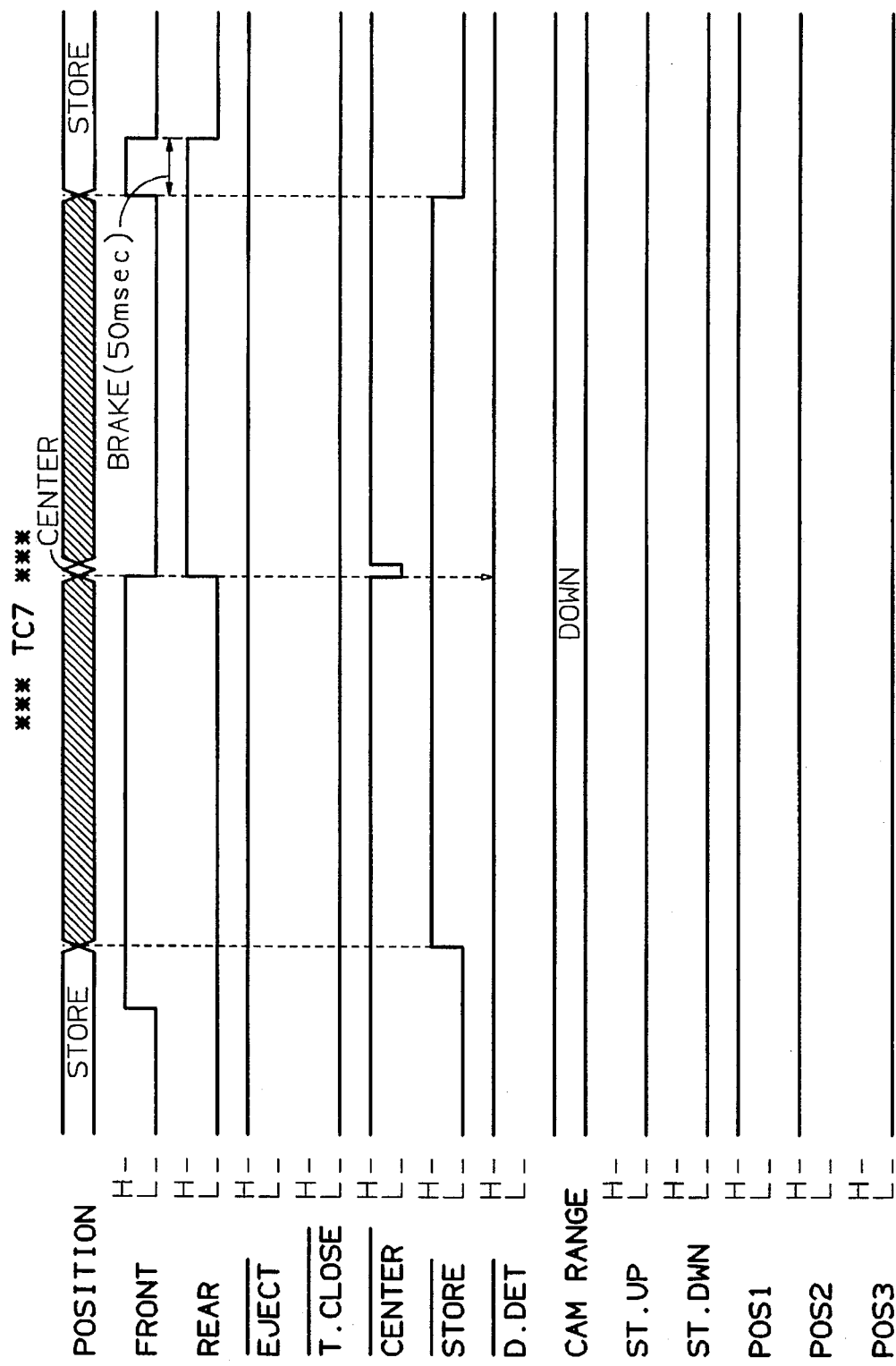
FIG. 28 is a timing chart TC7 used in describing a portion of the steps found in the flowcharts in FIGS. 17 and 21.

Referring now to FIGS. 17, 27 and 28, if the play key is pressed during the "STOP" mode, system controller 300 proceeds to a JOB PLAY routine, through steps S40 and S53, to step S154 at which the selected disc number "n" is compared with "m". If they are identical, control proceeds to step S54 where FLAG(m) checked. If not, magazine 50 moves to POS(n) from which control proceeds with step S54. At step S54, control branches to step S55 if FLAG(m) is "1" or to step S62 if FLAG(m) is "0". As stated, when FLAG(m)="1", a disc 1 is present on the selected carriage.

If FLAG(m) was "0" at step S62 system controller 300 searches all flags sequentially from FLAG(1) to FLAG(7). If a flag set to "1" is found, control proceeds to step S63, wherein magazine 50 moves to the position corresponding to the flag which was set to "1" Control then passes to step S55. If all of the flags are set to "0" in step S62, control immediately returns to the MAIN routine of FIG. 10. In the latter case the pressing of the play key is, in effect, ignored.

At a step 55, operations TC6 and TC7 commence as shown in FIGS. 27 and 28 respectively. Operation TC6 involves transferring a disc from a selected carriage in magazine 50 to the playback position, from which playback commences. Operation TC7 is a branch of TC6, responsive to no disc being present in the playback position, for returning the selected carriage to magazine 50.

System controller 300 outputs an "H" level signal at the FRONT output at step S55. The selected carriage moves out of magazine 50 toward the playback position until the CENTER input signal changes to "L" in step S56. Once the selected carriage arrives at the playback position, system controller 300 checks the D. DET input at step 57 to check if a disc 1 is present in the selected carriage. Step S57 thereby corrects data errors in FLAG(m) (possibly due to a power loss) to prevent unnecessary operations of the device.

If D.DET is "H", system controller 300 sets FLAG(m) to "0" at step S64. At step S65, an "L" signal level is applied to the FRONT output and an "H" signal level is applied to the REAR output, moving the selected carriage back to its store position. At step S67, once selected first carriage 51 arrives at the store position as indicated by the STORE input signal changes to "L", system controller 300 applies an "H" level to the FRONT output terminal and brakes tray motor 308 for 50 msec. This step completes operation TC7, after which control returns to step S62.

If at step S57, the D.DET input signal is "L," control proceeds to step S58, where system controller 300 moves tray 20 to the playback position. At step S59 cam member 110 rotates until it is in the UP range. After the CENTER input signal changes to "L," system controller 300 outputs an "H" level at the REAR signal terminal, braking tray motor 308. If, the carriage overshoots the playback position, an "L" signal level is output from the FRONT output terminal and the REAR output is cycled, at a 50% duty cycle with a 10 msec cycle period, slowly bringing the selected carriage to the playback position. Once the CENTER input signal changes to "L," "H" levels are output at both the FRONT signal terminal and the REAR signal terminal for 50 msec. to magnetically brake tray motor 308.

Next, system controller 300 outputs an "H" signal level at the ST.DWN output terminal. Cam member 110 rotates counterclockwise, moving optical mechanism 200 toward its upper position. When optical mechanism 200 arrives at the up position and the POS 1 signal changes to "L," braking is induced by an "H" level ST.UP. This step completes operation TC6, after which control proceeds to step S60, where disc playback is initiated. At step S61, the MODE variable is set to indicate the "PLAY" mode. Control then returns to the MAIN routine.

Figure 18:
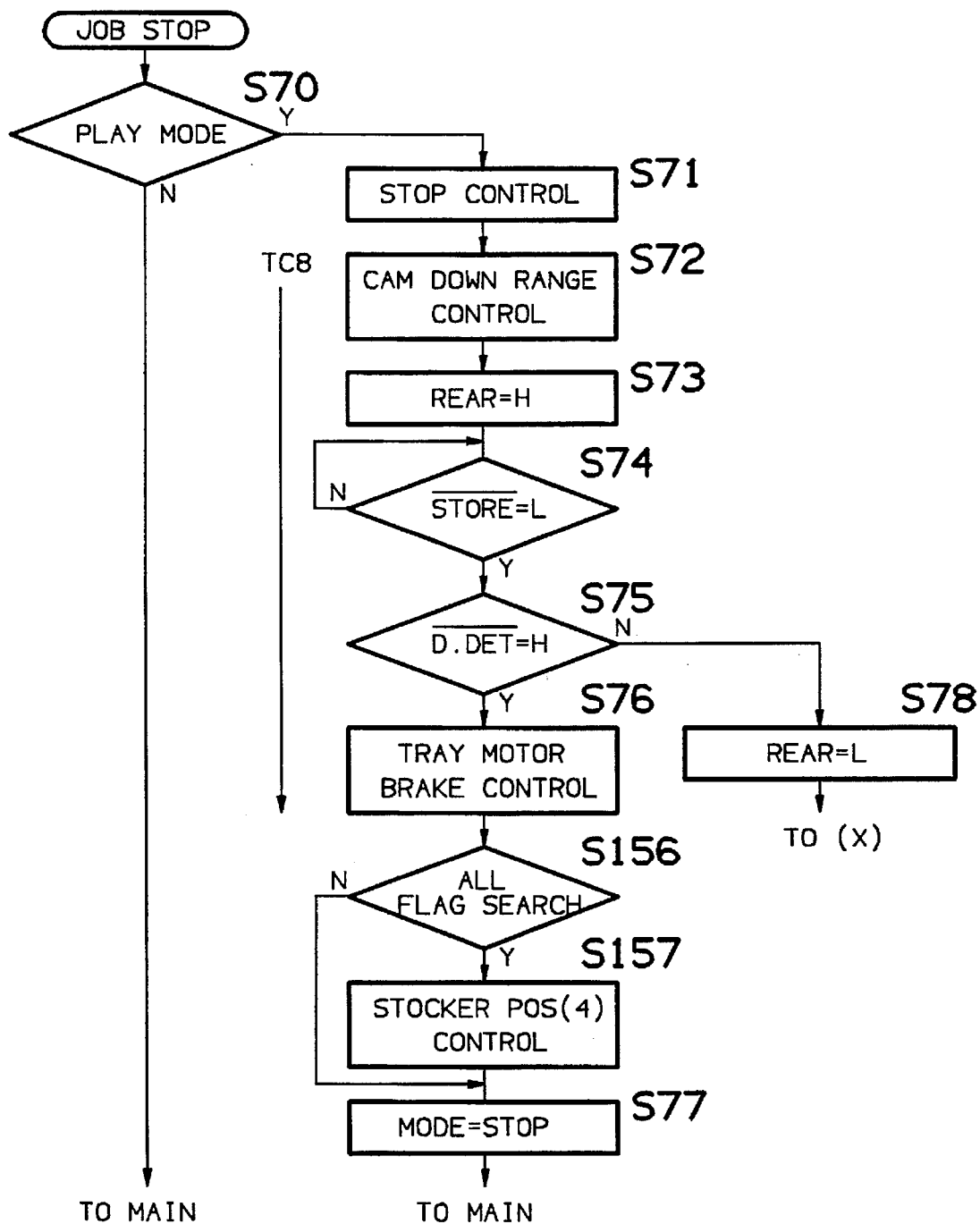
FIG. 18 is a flowchart showing the JOB STOP routine.
Figure 29:
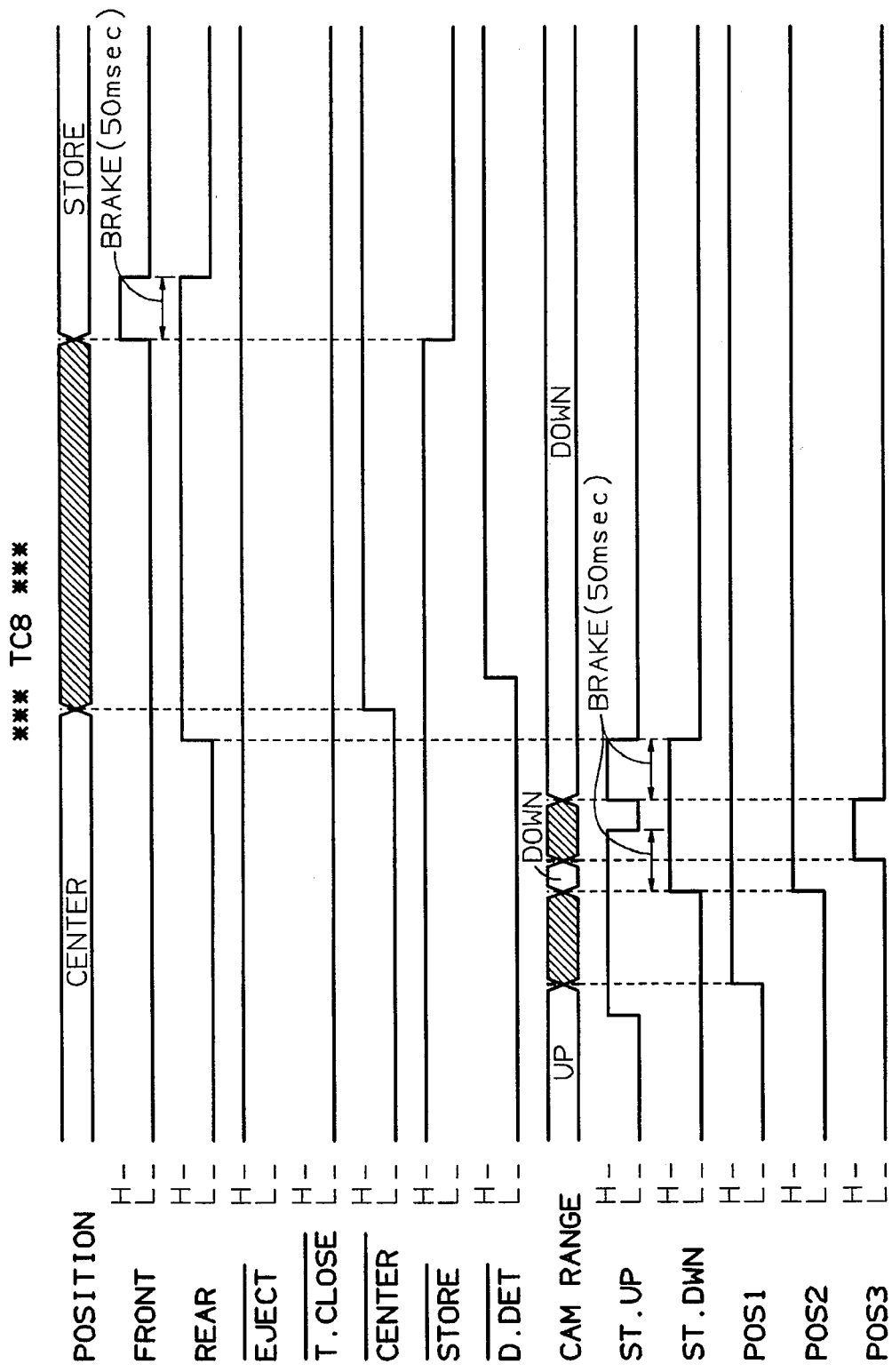
FIG. 29 is a timing chart TC8 used in describing a portion of the steps found in the flowcharts in FIGS. 18, 20 and 22.

Referring now also to FIGS. 18 and 29, when the STOP key is pressed during the "PLAY" mode, system controller 300 proceeds from step S3 of FIG. 12 through steps S70 and S71 of FIG. 18. Disc playback halts at step S71. At a step S72, operation TC8 begins, in which the selected carriage returns to the store position from the playback position.

At step S72, cam member 110 rotates toward the DOWN range. System controller 300 sets the ST.UP signal to "H". Cam member 110 rotates clockwise to move to move optical head 203 and lower disc-lock shaft 251 downward. System controller 300 compensates for any overshoot as described previously.

When optical head 203 reaches the down position and the POS 2 signal changes to "H," system controller activates the brake. Then, at step S73, system controller 300 outputs an "H" signal level from the REAR output the selected carriage to return the store position. Control passes to step S75 when the selected carriage arrives at the store position and the STORE input signal changes to "L" System controller 300 determines if a disc is present by the D.DET input signal. If no disc is present (D.DET signal is "L") at step S78, system controller 300 sets the REAR output signal to "L", whereby control proceeds to the flowchart of FIG. 14 as above. If a disc is present (D.DET is "H") control proceeds to step S76, where tray motor 308 magnetically brakes as described previously. This concludes operation TC8, and control proceeds to step S156.

At step S156, each Flag(m) is checked to determine if any discs are in magazine 50. If a Flag is detected, then magazine 50 moves to POS(4) at a step 157, thereby securing any 8 cm disc is first carriage 51 such that it cannot slip into the larger 12 cm cavity. At step S77 the MODE variable is set to indicate the "STOP" mode and control returns to the MAIN routine.

Figure 19:
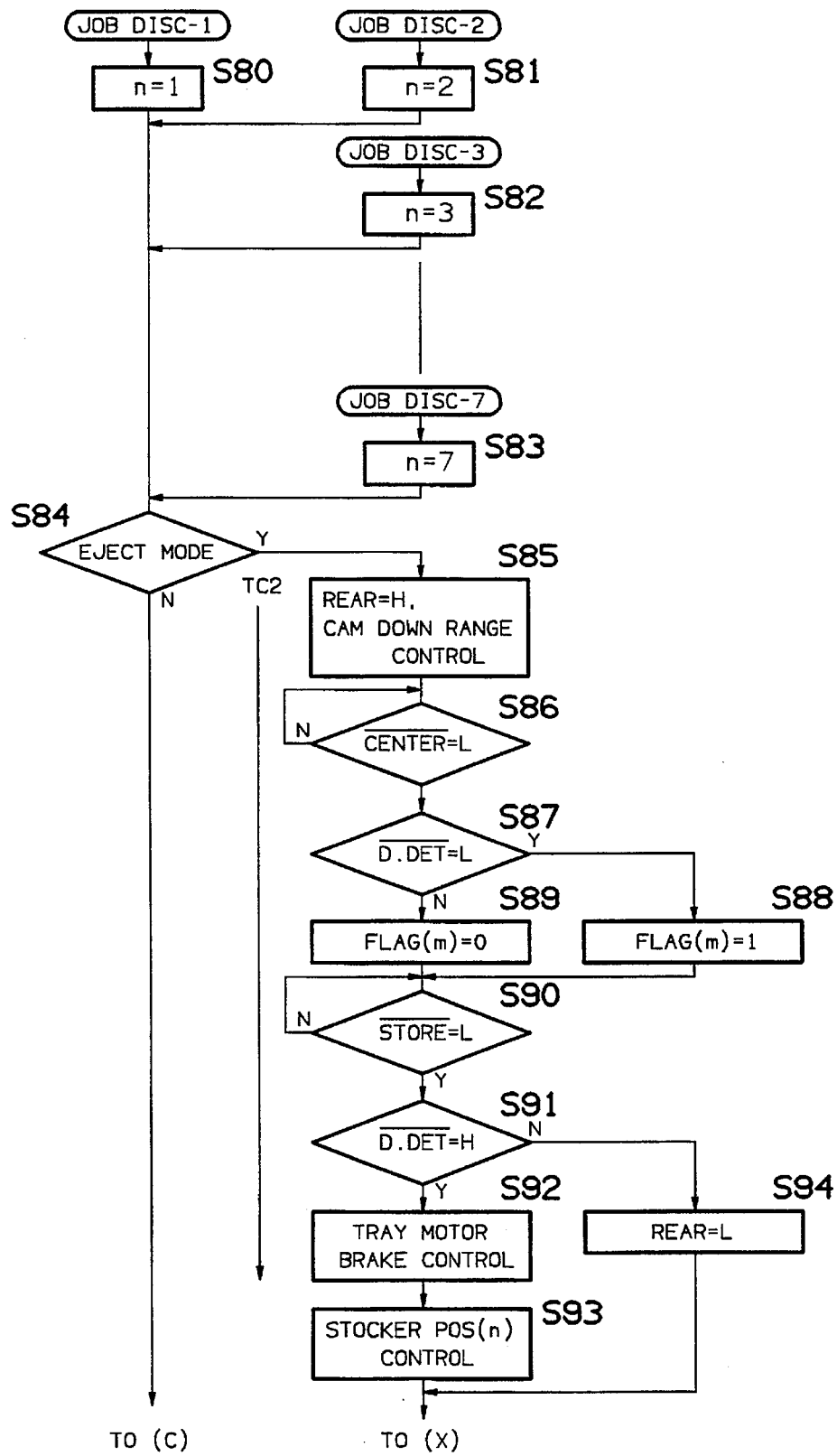
FIG. 19 is a flowchart showing the JOB DISC routine.

Mode control panel 301 includes a plurality of DISC selection keys (not shown), one for each of the seven carriages 51–57 in magazine 50. Referring now also to FIGS. 19, when one of the DISC selection keys is pressed, system controller 300 branches from a corresponding one of steps S4 through S7 of FIG. 12 to a corresponding JOB DISC-N routine (steps S80–S83) shown in FIG. 19, where N is the number of the DISC selection key that is pressed. A constant n is set to "1", "2", . . . "7" according to the DISC selection key pressed.

If the disc selection key is depressed while the device is in the "EJECT" mode, control proceeds to operation TC2 (movement from the eject position to the store position) through a series of steps S85–S92 and S94. These steps are identical to steps S11–S18 and S20, respectively, and need not be repeated here. After step S92 in which the tray motor 308 stops, magazine 50 moves to POS(n). Control then proceeds to step S21 in FIG. 14, discussed above.

Figure 20:
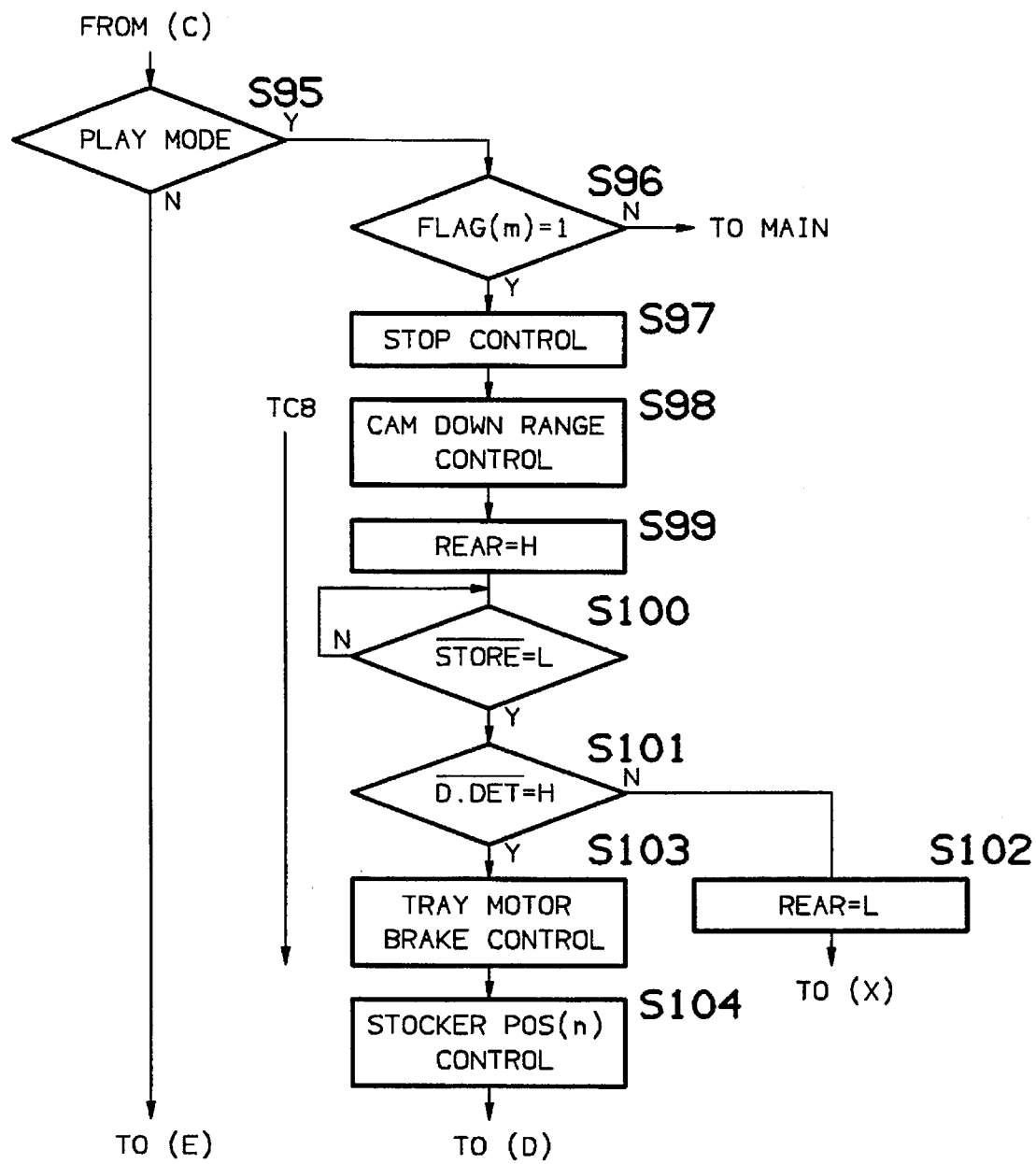
FIG. 20 is a flowchart showing the JOB DISC routine.

Referring now to FIGS. 20 and 29, when a DISC key is pressed during "PLAY" mode, system controller 300 proceeds from the corresponding JOB DISC routine (the one of S81–S83 corresponding to the key pressed) to steps S84, S95 and S96, wherein FLAG(m) is checked for the presence of a disc, where m is the DISC key number that was pressed. If no disc is present (FLAG(m) is "0") control immediately returns to the MAIN routine and the pressing of a DISC key is, in effect, ignored. If a disc is present (FLAG(m) is "1"), control proceeds to step S97 where system controller 300 halts disc playback.

Beginning with step S98, the routine proceeds through operation TC8 (movement from the playback position to the store position) through a series of steps S98–S102. These steps are identical to steps S72–S76 and S78, and need not be repeated here. After step S103 in which the tray motor 308 stops, magazine 50 moves to POS(n). Control then proceeds to step S105 in FIG. 21.

Figure 21:
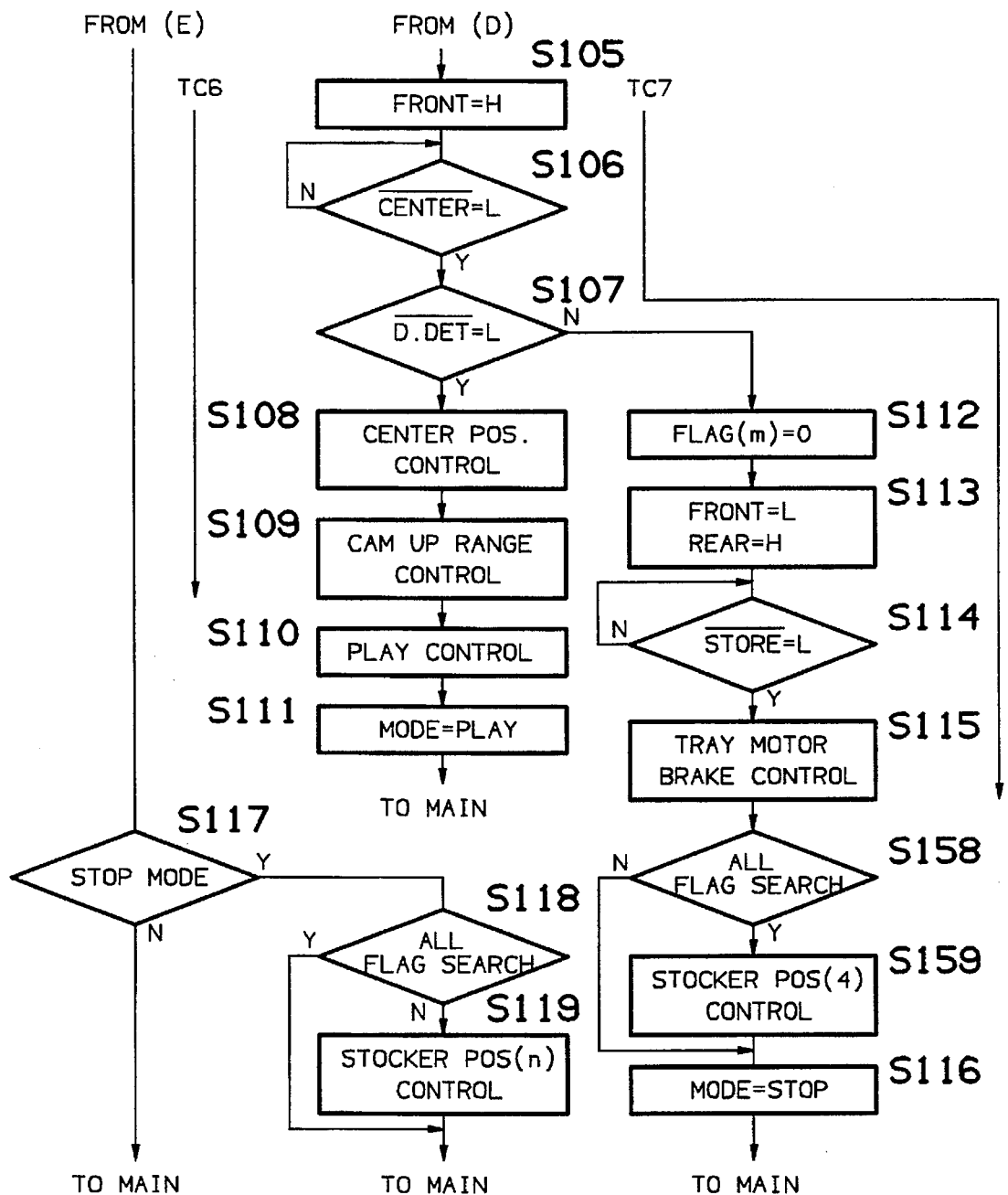
FIG. 21 is a flowchart showing the JOB DISC routine.

Referring now also to FIG. 21, both operations TC6 and TC7 commence at step 105 through S115, which are identical to steps S55–S61 and S64–S67 of FIG. 17 (store position to playback position; if a disc is not in the selected carriage, return to store position), described above. Following a step 115 in which motor 308 is braked, each Flag(m) is checked to determine if any discs are stored in magazine 50. If a Flag is detected, then magazine 50 moves to POS(4) at a step 159, thereby securing any 8 cm disc is first carriage 51 such that it cannot slip into the larger 12 cm cavity. At step S116 the MODE variable is set to indicate the "STOP" mode and control returns to the MAIN routine.

When a DISC key is pressed during the "STOP" mode, system controller 300 proceeds to the appropriate JOB DISC procedure as described above. After setting variable n to a value corresponding to the DISC key pressed, control passes through steps S84, S95 and S117 to step S118. At step S118 magazine 50 moves to position Pos(n), the position corresponding to the key pressed, and control returns to the MAIN routine.

Figure 22:
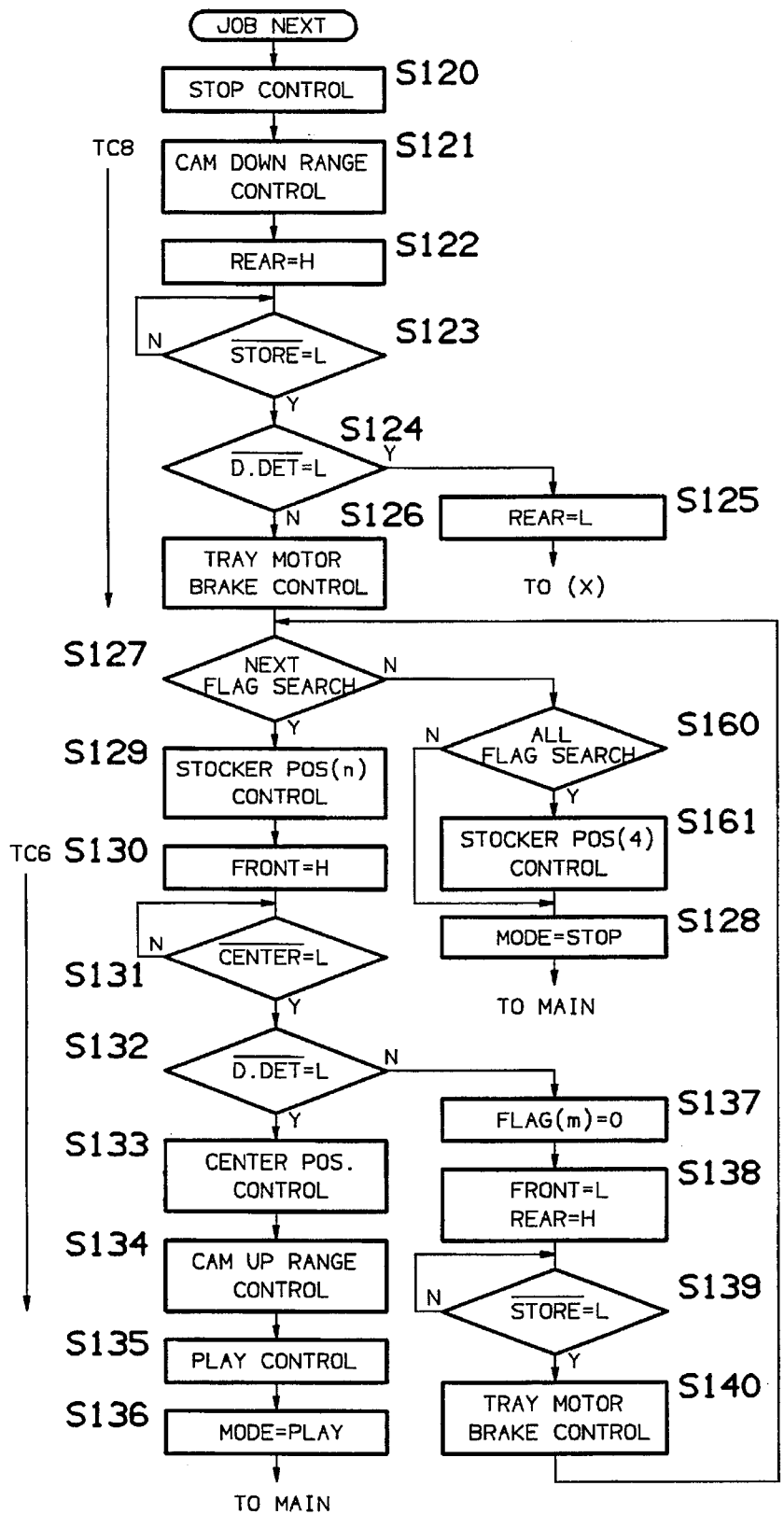
FIG. 22 is a flowchart showing the JOB NEXT routine.
Figure 23:
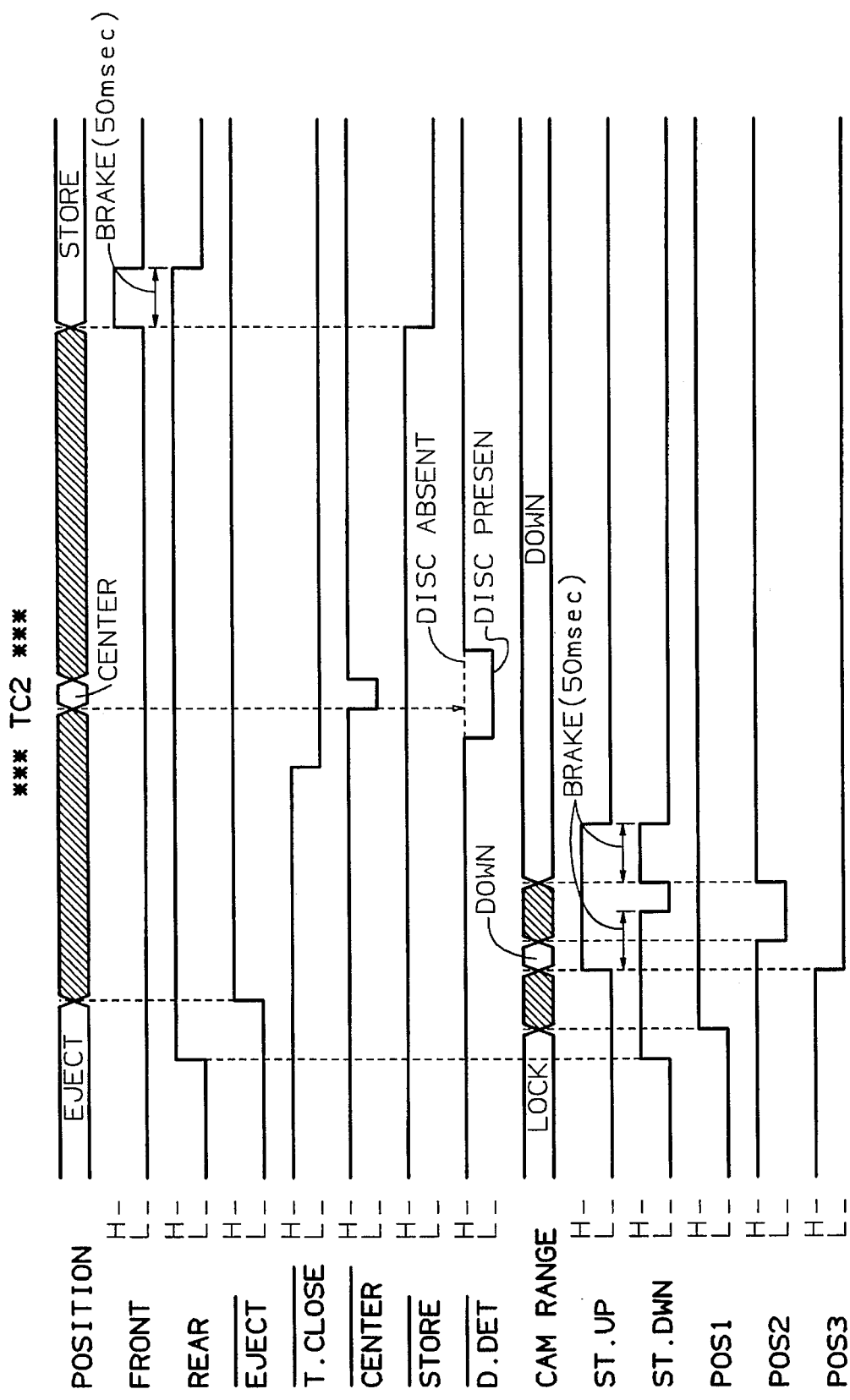
FIG. 23 is a timing chart TC2 used in describing a portion of the steps found in the flowcharts in FIGS. 13, 16 and 19.
Figure 24:
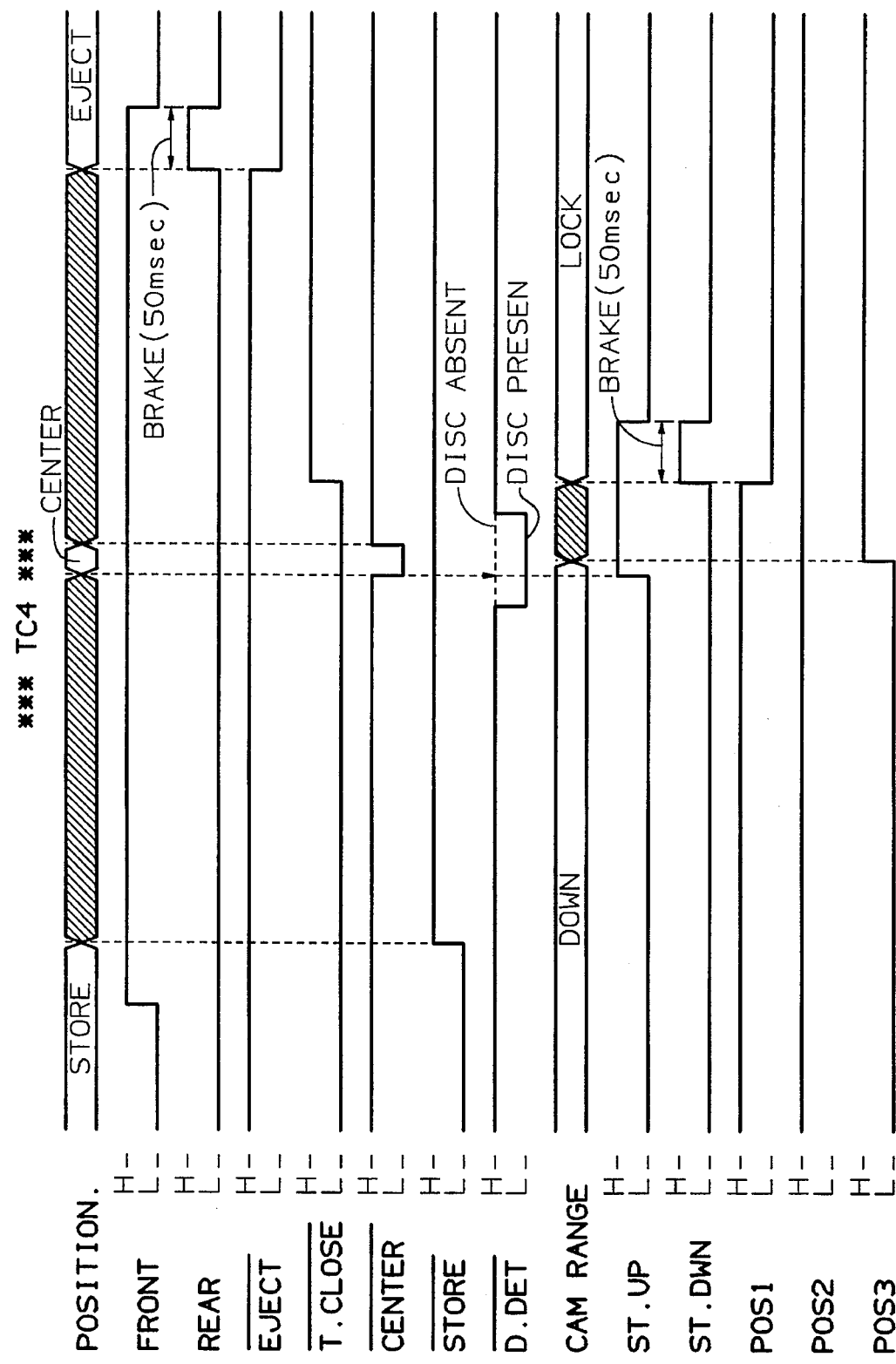
FIG. 24 is a timing chart TC4 used in describing a portion of the steps found in the flowchart in FIG. 14.

Referring now to FIG. 22, the operation of continuous playback in play mode is described. System controller 300 detects when playback of a disc is completed from signal processor circuit 320. Control proceeds from step S8 of FIG. 12 to step S120 in FIG. 22, where the disc is halted. Commencing with step S121, the routine proceeds through operation TC8 (movement from the playback position to the store position) through a series of steps S121–S126. These steps are identical to steps S72–S76 and S78 of FIG. 18, discussed above.

At a step S127, the flags are checked sequentially beginning with FLAG(m+1) through Flag(7) to locate the next disc in magazine 50. If no disc is present, then all flags are searched. If a disc is detected, magazine 50 moves to POS(4) to secure first carriage 51, as previously described. Following magazine movement, or in the event that no disc is in magazine 50, the MODE variable is set to indicate the "STOP" mode and control returns to the MAIN routine.

If a Flag is detected in Flag(m+1) through Flag(7), then magazine 50 moves to POS(n) at step S129, where n is the first sequential carriage in which the flag was detected.

Step 130 commences both operations TC6 and TC7. Steps S130–140 are identical to steps S55–S61 and S64–S67 of FIG. 17 (store position to playback position; if a disc is not in the selected carriage, return to store position), described above. If no disc is present, control proceeds from S140to S127. If a disc is present, disc playback resumes, MODE is set to play, and control returns to the main routine.

Figure 30:
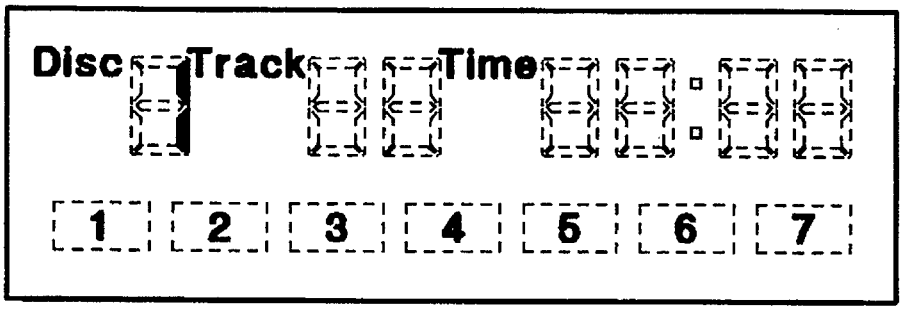
FIG. 30 is a sample display for display 329.
Figure 31:
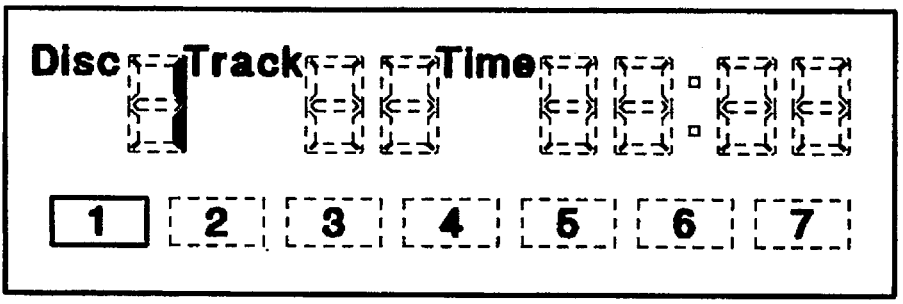
FIG. 31 is another sample display for display 329.
Figure 32:
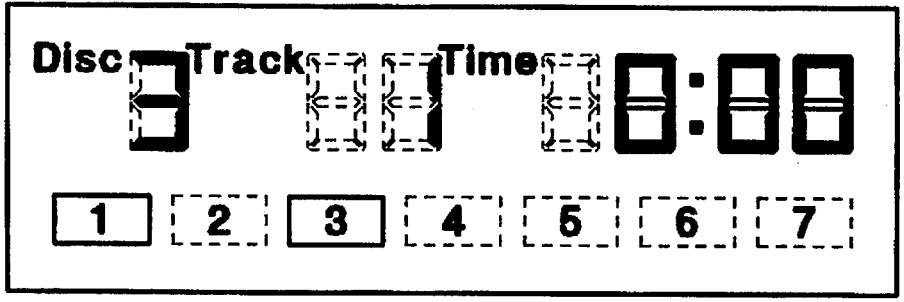
FIG. 32 is still another sample display for display 329.

Referring now to FIGS. 30–32, a display 329 indicates various modes of operation and the presence of discs as the foregoing operations occur.

Various alterations of the embodiment described above may be effected by those of ordinary skill in the art, having the benefit of this description, without departing from the scope and spirit of the present invention. For example, while the embodiment described uses carriages to transport discs, it is possible to eliminate the use of carriages in the practice of the present invention. It is also possible to transport a selected disc by rollers engaging either surfaces or edges of the selected disc. Alternatively, a belt may be substituted for the rollers. Another possible alteration is the use of an independent drive source for raising and lowering lower disc lock shaft 251 rather than employing cam member 100 which is also used to raise and lower the optical mechanism 200.

Alternate methods can also be used to secure 8 cm discs. In the stop mode, an empty carriage could be moved to the store position, thereby securing the remaining occupied carriages. If additional carriages had 8 cm capacity, a different rest position (other than Pos(4)) could be used.

Thus, the present invention provides a mechanism to ensure secure storage of discs in magazine 50 regardless of mechanical shocks or a physical orientation of disc player 1000. This allows disc player 1000 to be used in environments outside of the stable confines of a dwelling, regardless of whether 12 cm discs or 8 cm discs are used. For instance, disc player 1000 is useful in applications requiring portable hand held operation or vehicle mounted operation.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disc player, for storing discs, each having a spindle hole, comprising:

a magazine having a plurality of means for holding a disc;

a playback position;

means for reading said selected disc, of said discs, in said playback position;

means for transporting said selected disc between said playback position and a store position in said magazine;

a first shaft extending into said magazine, through said spindle hole of at least one of said discs in said magazine and having an end in said magazine at a first position;

a second shaft extending into said magazine, coaxially aligned with and opposing said first shaft;

said second shaft extending through said spindle hole of at least another of said discs held in said magazine and having an end in said magazine at a second position;

said first and second positions defining a gap, aligned in a common plane with said playback position, said selected disc passing through said gap when said means for transporting said selected disc transports said selected disc between said store position in said magazine and said playback position;

means, responsive to all of said discs in said disc player being in said magazine, for moving said magazine to a predetermined position;

means for slidably mounting said second shaft; and means for shifting said second shaft in an axial direction to a lock position, closing said gap, thereby securing said discs in said magazine by extensions of each of said first and second shafts through spindle holes of said discs.

2. The disc player of claim 1 further comprising control means for controlling said means for shifting to place said second shaft in said lock position when said means for transporting is in a store state.

3. The disc player of claim 2 wherein, said control means for controlling said means for shifting is effective to place said second shaft in said lock position when said means for transporting is in a playback state.

4. The disc player of claim 1 further comprising control means for controlling said means for shifting to place said second shaft in said lock position when said means for transporting is in a playback state.

5. The disc player of claim 1 further comprising:

said means for transporting including means for moving a disc from between said playback position to an eject position whereat access is provide for loading and unloading discs; and control means for controlling said means for shifting to place said second shaft in said lock position when said means for transporting is in an eject state.

6. The disc player of claim 1 further comprising:

further means for shifting said second shaft to an unlock position to open said gap;

control means for controlling said means for shifting to place said second shaft in said unlock position when said means for transporting is in a transport mode for effecting transport of said selected disc out of said magazine from said store position, and to place said second shaft in said lock position when said means for transporting is in a mode other than said transport mode.

7. A disc player for storing discs, each having a spindle hole, and playing a selected disc of said discs, comprising:

a magazine having means for storing said discs;

a playback position;

means for reading said selected disc when said selected disc is moved to said playback position;

means for transporting said selected disc between said playback position and a store position within said magazine;

a first shaft extending into said magazine, through said spindle hole of at least one of said discs held in said magazine and having an end in said magazine at a first position;

a second shaft extending into said magazine coaxially aligned with and opposing said first shaft;

means for slidably mounting said second shaft;

said second shaft extending through said spindle hole of at least another of said discs held in said magazine and having an end in said magazine at a second position;

said first and second positions defining a gap, aligned in a common plane with said playback position, said selected disc passing through said gap when said means for transporting said selected disc transports said selected disc between said store position in said magazine and said playback position;

locking means for shifting said second shaft in an axial direction to a lock position, closing said gap, thereby securing said discs in said magazine by extensions of each of said first and second shafts through spindle holes of said discs;

said locking means including means for biasing said second shaft toward said first shaft and means for displacing said second shaft, in a direction opposing said means for biasing, effective for creating said gap; and means, responsive to a predetermined condition, for moving said magazine to a predetermined position wherein one of said first and second shafts pierce said spindle hole of selected ones of said discs.

8. The disc player according to claim 7 wherein said means for displacing further includes a cam member applying pressure to said second shaft to effect displacement against said means for biasing.

9. The disc player according to claim 8 wherein:

said means for reading includes an optical head and turntable assembly;

means for movably mounting said optical head and turntable assembly permitting functional engagement of said selected disc at said playback position when said optical head and turntable assembly is in a read position; and means for coupling said cam member and said optical head and turntable assembly permitting movement of said optical head and turntable assembly between said read position and an inactive position.

10. The disc player according to claim 7 further comprising coupling means for coupling an optical head and turntable assembly with said means for displacing to move said optical head and turntable assembly between a read position, whereat said selected disc is engaged by said turntable, and an inactive position whereat said optical head and turntable assembly is moved clear of a path of transport of said means for transporting.

11. A magazine for storing discs, each having a spindle hole, comprising:

means for holding said discs in a concentric array with said spindle holes aligned;

a shaft extending through said spindle holes of said discs to secure said discs in said magazine;

means for slidably mounting said shaft;

means for retracting said shaft, at least partially from said magazine, to allow withdrawal or insertion of a single disc at a time past an end of said shaft into said magazine;

means, responsive to all existing discs being in said magazine, for moving said means for holding discs such that said shaft pierces predetermined ones of said discs through said spindle holes;

a second shaft extending into said magazine, through said spindle hole of at least one disc of said discs in said magazine and having an end in said magazine at a first position;

said second shaft being coaxially aligned with and opposing said first shaft in said magazine;

said first shaft having an end contacting an end of said second shaft in said magazine;

retracting means for shifting said first shaft in an axial direction to an unlock position, opening a gap between said ends of said first and second shafts;

selected ones of said discs removable from said magazine through said gap; and means for biasing said first shaft toward said second shaft.

* * * * *